July 22, 1941.  W. M. CARROLL  2,250,326
FLUID DISPENSING APPARATUS
Filed Jan. 23, 1937  11 Sheets-Sheet 2

William M. Carroll
INVENTOR.
BY Edmund W. F. Kamm
ATTORNEY.

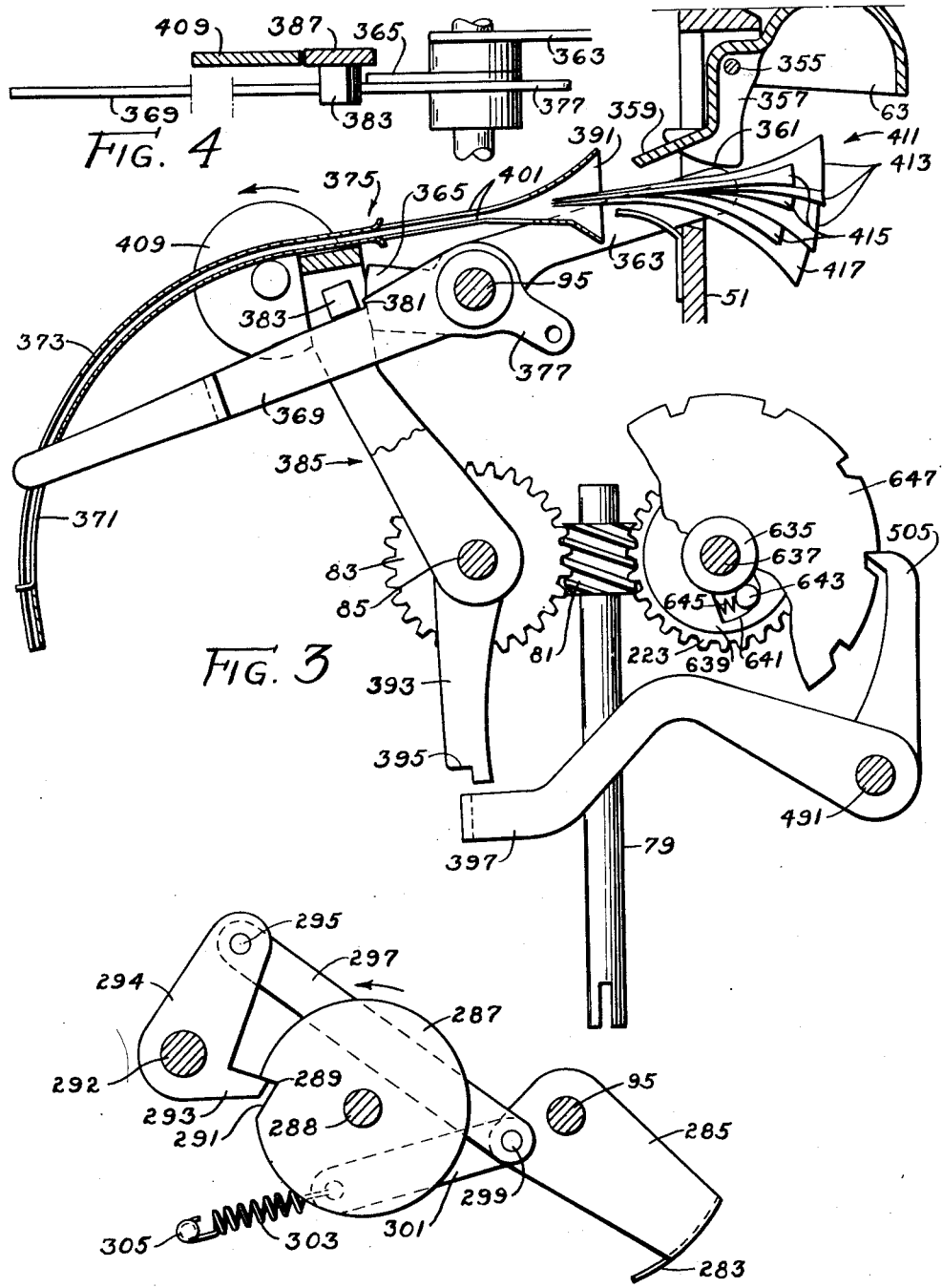

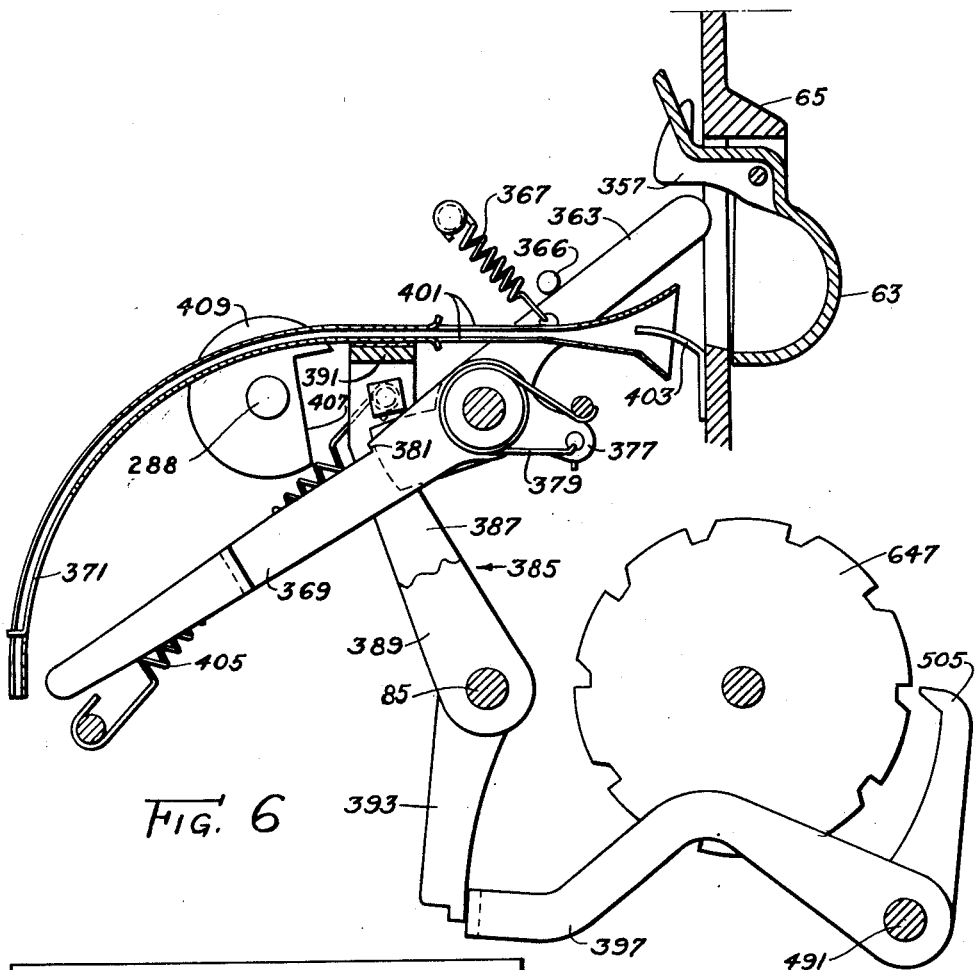

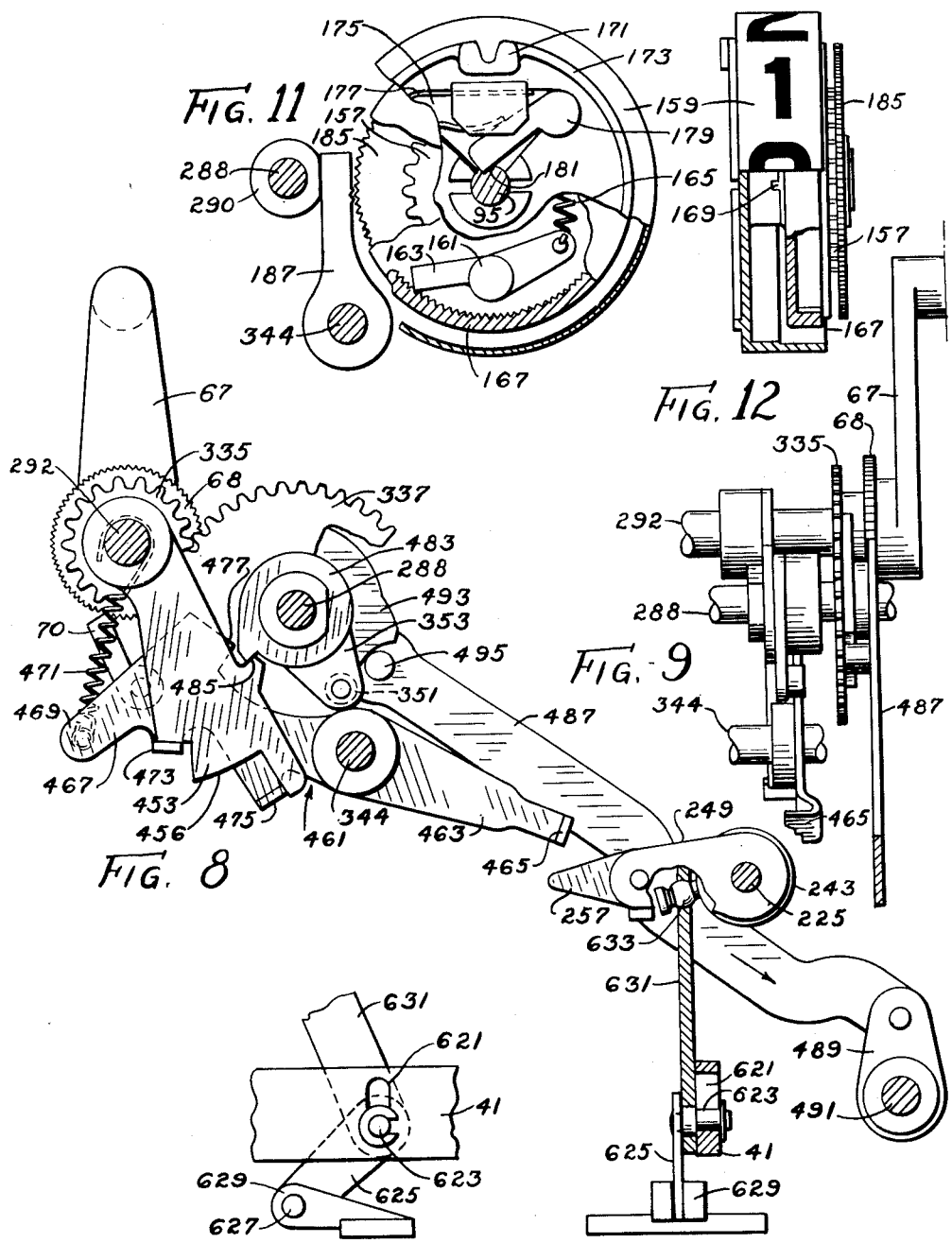

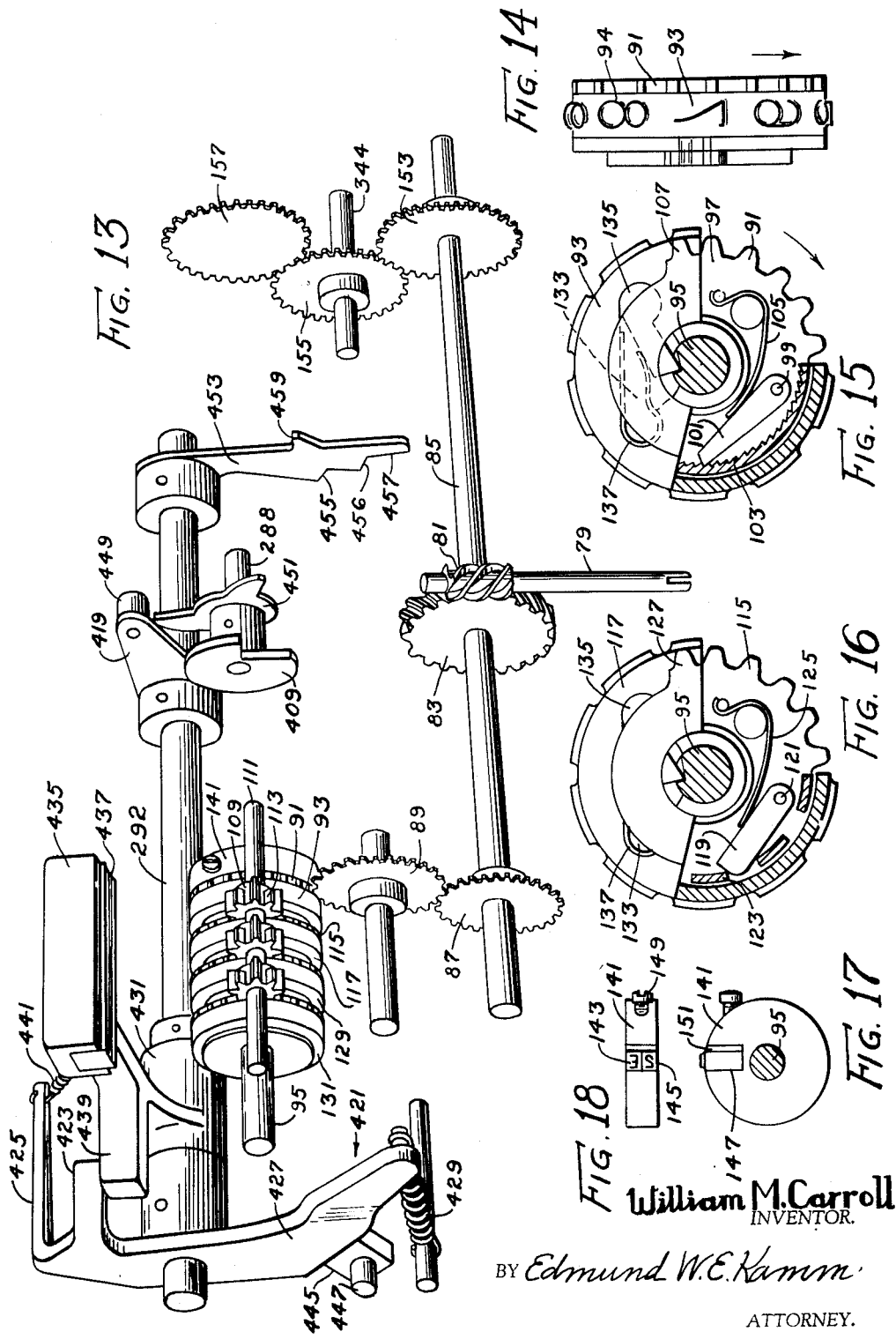

July 22, 1941.  W. M. CARROLL  2,250,326
FLUID DISPENSING APPARATUS
Filed Jan. 23, 1937  11 Sheets-Sheet 7
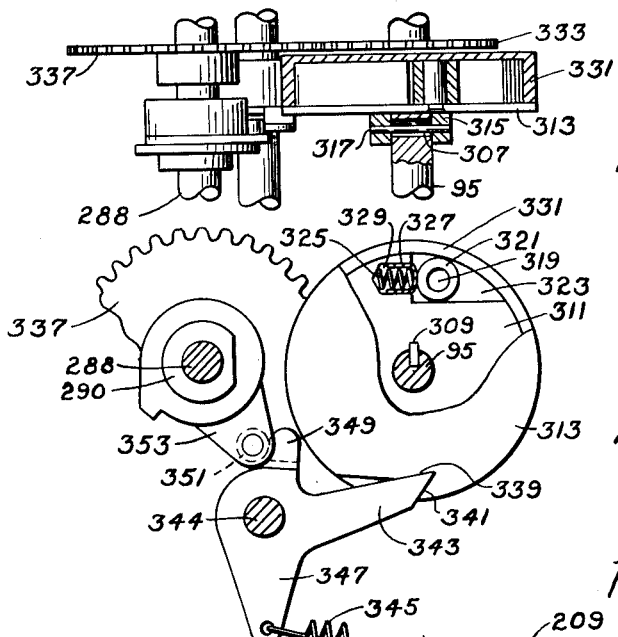
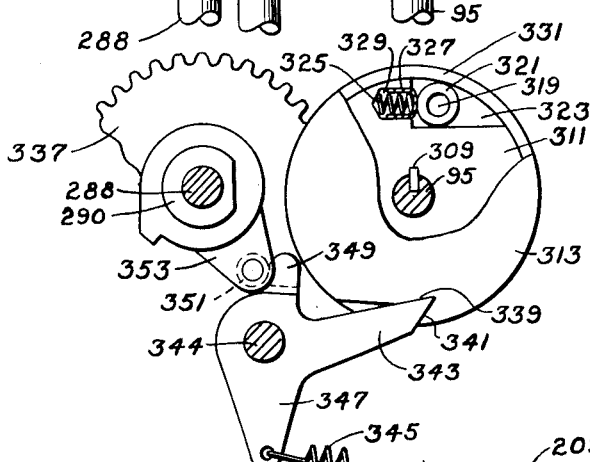
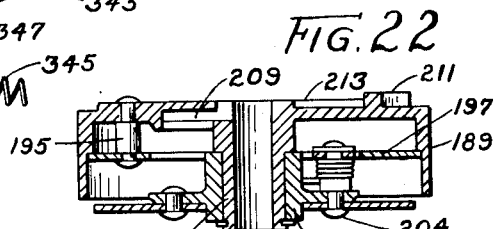
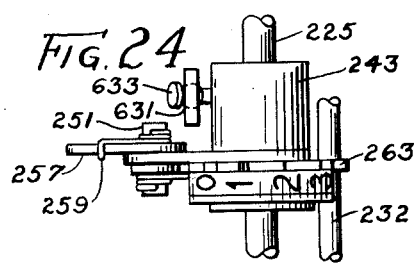
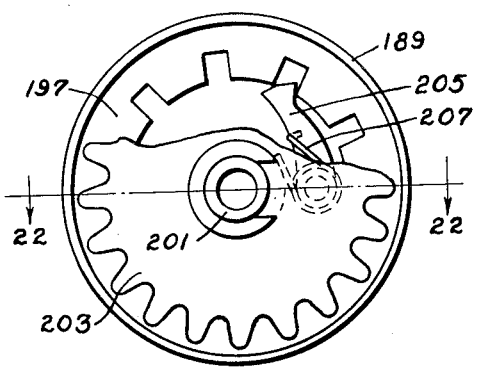
William M. Carroll
INVENTOR.
BY Edmund W. E. Kamm
ATTORNEY.

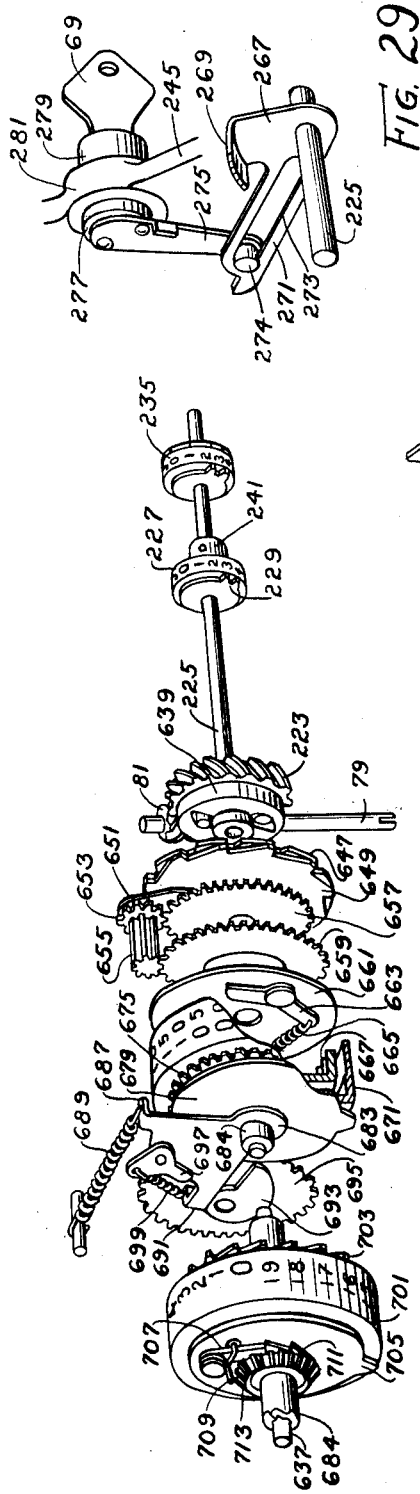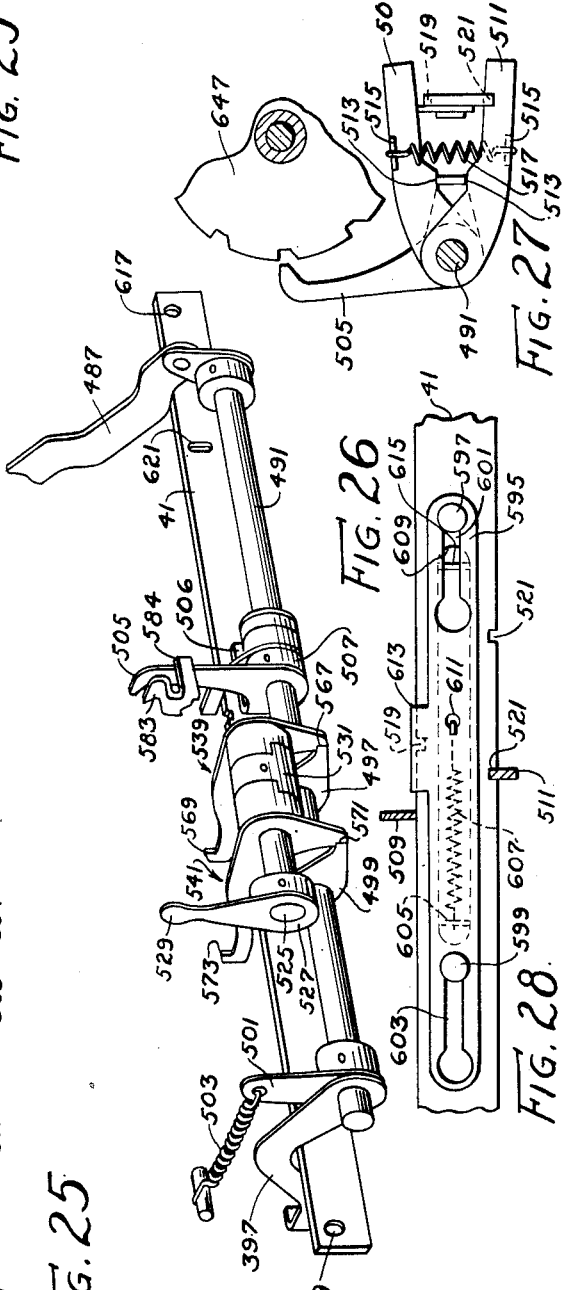

July 22, 1941.   W. M. CARROLL   2,250,326
FLUID DISPENSING APPARATUS
Filed Jan. 23, 1937   11 Sheets-Sheet 9
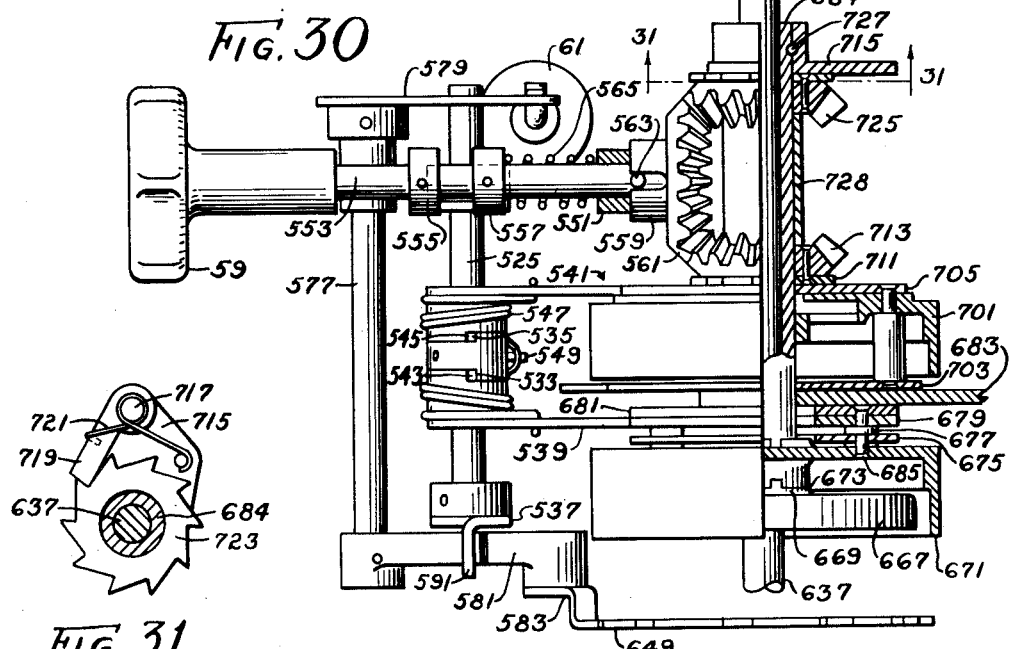
FIG. 30
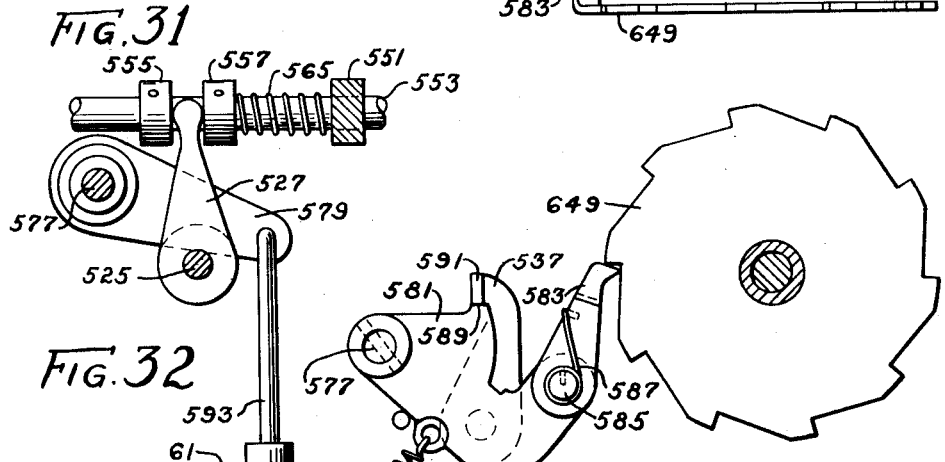
FIG. 31
FIG. 32
FIG. 33
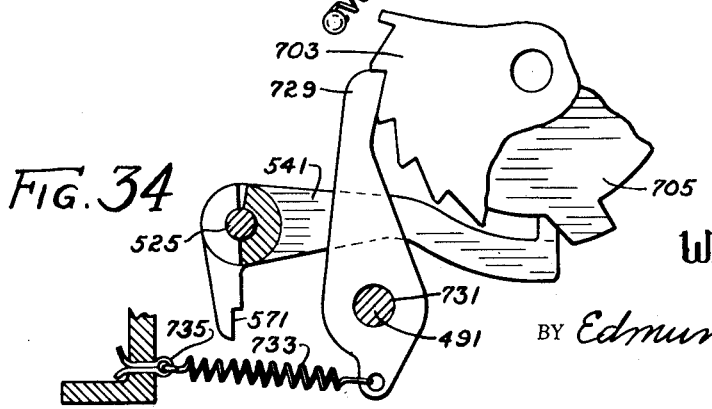
FIG. 34
William M. Carroll
INVENTOR.
BY Edmund W. E. Kamm
ATTORNEY.

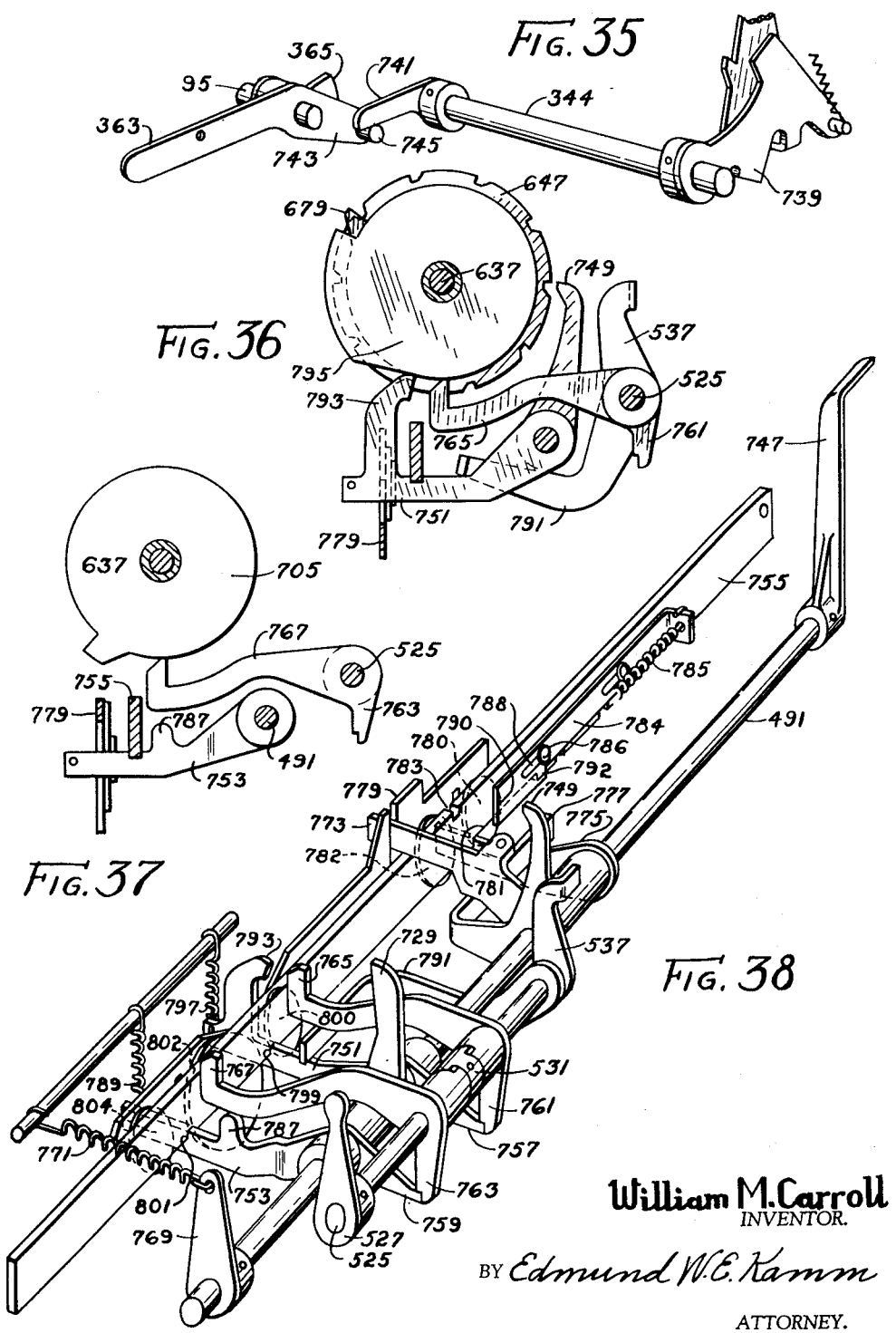

July 22, 1941.　　　W. M. CARROLL　　　2,250,326
FLUID DISPENSING APPARATUS
Filed Jan. 23, 1937　　　11 Sheets-Sheet 11
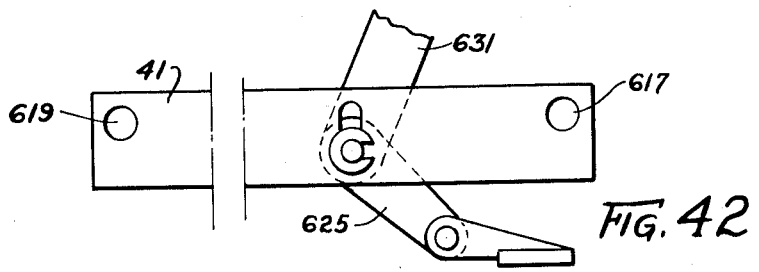
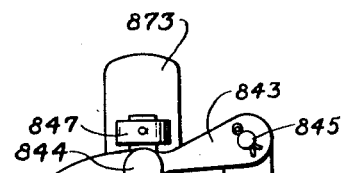
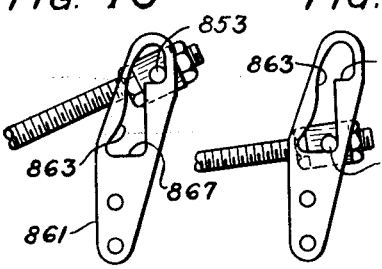
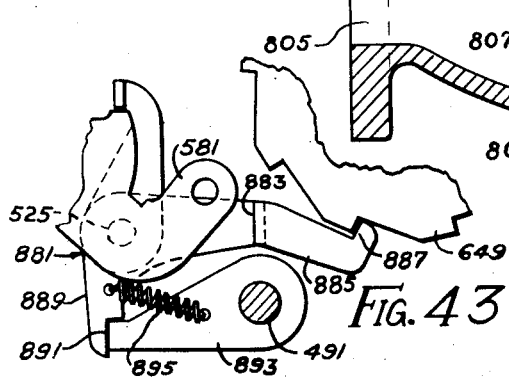
William M. Carroll
INVENTOR.
BY Edmund W. E. Kamm
ATTORNEY.

Patented July 22, 1941

2,250,326

UNITED STATES PATENT OFFICE 2,250,326

FLUID DISPENSING APPARATUS

William M. Carroll, Fort Wayne, Ind., assignor to S. F. Bowser & Company, Incorporated, Fort Wayne, Ind., a corporation of Indiana Application January 23, 1937, Serial No. 122,052

36 Claims. (Cl. 221—101)

This invention relates to a dispensing system in which a series of operations necessary to effect a dispensing operation are carried out in a predetermined sequence to accomplish the delivery of a commodity such as liquid fuel, and in which the sequence of operations is mechanically enforced in order to insure a proper delivery of the liquid, and further, a permanent record of the transaction is made.

In recent years, the advent of the domestic oil burner for heating dwellings, stores, apartments, etc., has introduced various problems in the delivery of liquid fuel. It is apparent that with this type of heating equipment, the number of deliveries of liquid fuel was greatly enlarged.

The new demand for service led to the use of tank trucks for delivering the fuel and this in turn introduced problems of accurately dispensing liquid fuel to the customers. The use of gauge sticks in connection with either the truck tank or the consumers tank was unsatisfactory because, at best, these measures were inaccurate, consequently, meters were developed for use with the truck tanks but they introduced problems of dishonesty on the part of tank wagon operator and lack of confidence on the part of the customer in the honesty of the dealer and the operator.

The register used with meters of this type provided no check upon the truck operator and unless the customer himself read the register before delivery of his fuel commenced and after it was completed, he would have nothing but the word of the operator to assure him that the delivery of the required amount of fuel had been made. Often these deliveries were made in the absence of the purchaser and he had no opportunity to check the operator.

Further, since the bills were normally made out by the operator of the tank wagon, the accuracy of the bill depended upon the accuracy with which the readings of the register were taken and also the accuracy of the operator's arithmetic.

Such conditions were provocative of disagreements between dealer and customer and of detriment to both. It is one purpose of applicant's invention to eliminate such causes of friction between the dealer and the consumer.

One purpose of the invention is to provide a system of interlocking mechanisms on dispensing equipment which will insure a correct delivery of fuel.

Another purpose of the invention is to provide certain data which enables the dealer to check upon the honesty of the truck operator.

Yet another purpose of the invention is to provide certain data which will facilitate the bookkeeping operations of the dealer.

Still another object of the invention is to provide a printed record which discloses directly the volume of fluid dispensed.

Still a further object of the invention is to provide a printed record of each delivery to protect the customer and to assist the dealer.

Another object of the invention is to provide a system of interlocks which require a definite sequence of operations of the machine by the truck operator thereby insuring a proper delivery.

A further object of the invention is to provide means for eliminating arithmetical calculations of the operator or the customer.

Further objects are as follows:

To provide means for printing a ticket at the beginning and end of a dispensing operation to show the condition of the registers at the initiation and termination of a delivery.

To provide means for identifying the mechanism from which the ticket was issued.

To provide interlocking means which requires the insertion of a ticket before operation of the delivery means can take place.

To provide means for enclosing and protecting the ticket against damage due to weather conditions.

To provide means to prevent removal of the ticket before a final printing operation has been effected.

To provide means whereby every operation of the control valve is recorded.

To provide a mechanism which will cause automatic closure of the control valve when a predetermined quantity of fluid has been dispensed.

To provide means for resetting the registers to zero.

To provide means interlocking said resetting means and said printing means so that an impression will be taken by the printing means when the registers have been reset.

To provide interlocking means which prevent dispensing until resetting has been accomplished.

To provide means for automatically taking an impression from one of the registers when dispensing is terminated.

To provide emergency releasing mechanism to permit termination of dispensing before the predetermining mechanism functions.

To provide means whereby the operation of the emergency release mechanism effects the operation of the printing mechanism.

To provide means for masking the registers during resetting of said registers.

To provide means for locking certain registers of the machine against unauthorized inspection.

To provide automatic ticket positioning means which is adapted to present different portions of the ticket to the printing mechanism.

To provide an interlock mechanism which prevents operation of the machine until the ticket door is closed.

To provide multiple means operable in sequence for maintaining said ticket door locked until the dispensing operation is complete.

To provide means for preventing motion of the register driving trains during resetting.

To provide means for effecting a gallonage printing operation by means which are operated only with the valve.

To provide means for giving the reset shaft a slight initial reverse motion to insure that all of the register dials will become engaged therewith.

To provide means whereby both predetermined quantity dials may be adjusted by a single operator.

To provide emergency release mechanism which may be operated to terminate the dispensing on an even gallon or immediately without regard to the gallonage.

To provide a transfer mechanism which will operate substantially instantaneously.

To provide means whereby certain elements in the predetermining mechanism may be driven independently of the meter.

To provide a control mechanism for a valve which may be connected at either end to the valve.

To provide a mechanism of the type described in which a series of operations of the valve may be effected manually without printing or resetting the registers.

To provide a mechanism in which a series of operations of the valve may be effected manually without printing or resetting and in which printing of the total gallonage dispensed during the series of operations is effected when the ticket door is opened.

To provide a mechanism of the kind described in which printing is automatically effected upon opening of the ticket door instead of by the closing of the valve.

To provide a mechanism of the type described in which termination of discharge is accomplished in two stages.

To provide a two stage valve and mechanism for operating said valve so that any desirable fixed quantity as for instance approximately twenty five gallons of each delivery will be dispensed at less than the maximum rate of flow.

To provide a valve control mechanism for effecting termination of the flow of fluid in two stages and means for assuming the load imposed by the valve closing spring, independent of said control mechanism.

To provide a mechanism for automatically terminating the flow of fluid in two stages and means for instantly terminating said flow in instances of emergency.

To provide a mechanism for automatically terminating the flow of fluid in two stages or for manually terminating the flow at an even gallon independently of the setting of the automatic flow terminating mechanism.

To provide in conjunction with a two stage flow controlling mechanism a ticket printing mechanism which is interlocked therewith to enforce a predetermined sequence of operation.

To provide in connection with a two stage fluid flow controlling mechanism, a ticket printing mechanism which is operated automatically at the termination of fluid flow to record the quantity of fluid discharged.

To provide in connection with a two stage fluid flow controlling mechanism, manual means for performing a series of fluid dispensing operations, and means for printing a ticket at the end of said series of operations to record the quantity of fluid dispensed.

To provide a valve control mechanism which is adapted to enforce a fixed sequence of operations thereof to secure the accurate dispensing of a quantity of fluid and the taking of accurate records of the dispensing operation.

To provide in a combination of mechanisms, means for restraining certain of said mechanisms for operation in a predetermined sequence, while permitting the actuation of other of said mechanisms out of sequence so long as such actuation is not detrimental to the accuracy of the dispensing operation or of the record.

These and other objects will become apparent from a study of the specification in connection with the accompanying drawings of which:

Figure 3 is an elevation showing the ticket chute in its ticket receiving position together with various interlocking mechanisms and part of the predetermining mechanism.

Figure 4 is a plan view of the ticket actuated interlocking mechanism.

Figure 5 is a detail elevation showing the volume register shutter operator.

Figure 6 is an elevation partly in section showing the ticket chute locked in its forward or door locking position.

Figure 7 shows the details of the ticket.

Figure 8 is an end elevation showing details of the printing hammer operating mechanism and the cocking mechanism for the predetermining pawls.

Figure 9 is a front elevation of the mechanism of Figure 8.

Figure 10 is an elevation showing the control bar operated toggle mechanism which operates the operations counter and the hammer tripping mechanism.

Figure 11 is an end elevation with parts broken away of a volume register dial of the lowest order and the driving train locking means.

Figure 12 is a front elevation of the volume register dial of Figure 11 shown partly in section.

Figure 13 is a perspective view showing the printing mechanism and the drive from the meter to the printing wheels and to the volume register.

Figure 14 is a front elevation of a printing wheel.

Figure 15 is a side elevation with parts broken away of the units or lowest order printing wheel.

Figure 16 is a side elevation with parts broken away, of the printing wheels of superior orders.

Figure 17 is an elevation of the meter identification unit.

Figure 18 is a plan view of the meter identification unit.

Figure 19 is an end elevation with parts broken away, of the clutch and other mechanism used to connect the resetting driving train with the resetting shaft.

Figure 20 is a plan view, partly in section of the mechanism shown in Figure 19.

Figure 21 is an end elevation partly broken away, of one of the volume register dials of the higher orders.

Figure 22 is a section taken on the line 22—22 of Figure 21.

Figure 23 is an end elevation of the counter used to record the number of operations of the mechanism.

Figure 24 is a plan view of the mechanism of Figure 23.

Figure 25 is an expanded perspective view of the predetermining mechanism, total gallons accumulating register, and operations register.

Figure 26 is a perspective view of the control bar and its associated mechanism.

Figure 27 is an elevation showing the control bar and its retaining pawls.

Figure 28 is a detail showing the control bar and its slide member which permits setting of the predetermining mechanism after resetting is completed.

Figure 29 is a perspective showing the means for locking the total accumulator and total operations registers' shutter.

Figure 30 is a plan view partially in section showing the predetermining device and its associated setting mechanism.

Figure 31 is an elevation taken on the line 31—31 of Figure 30 showing the ratchet drive to the small increment predetermining dial.

Figure 32 is an elevation showing a part of the emergency release mechanism.

Figure 33 is an elevation showing the emergency release, ratchet actuating pawl.

Figure 34 is an elevation showing a locking pawl adapted to prevent retrogression of the hundred gallons predetermining dial.

Figure 35 is a perspective of a modified hammer tripping device.

Figure 36 is an elevation showing the intermediate cam of the two stage valve control mechanism and its associated elements.

Figure 37 shows the first cam of the two stage valve control mechanism and its associated mechanism.

Figure 38 is a perspective view showing the manually operable two stage valve controlling mechanism aside from the operating cams.

Figure 39 is an elevation partly in section of the two stage valve and its operating mechanisms.

Figure 40 is an elevation showing a portion of the valve linkage in the fully actuated position.

Figure 41 is a view similar to that of Figure 40 showing the linkage in the first stage position.

Figure 42 is an elevation showing a modified arrangement of the control mechanism in its operated position.

Figure 43 is an end elevation of a modified form of latching device.

GENERAL DESCRIPTION

Figures 1 and 2

Figure 1:
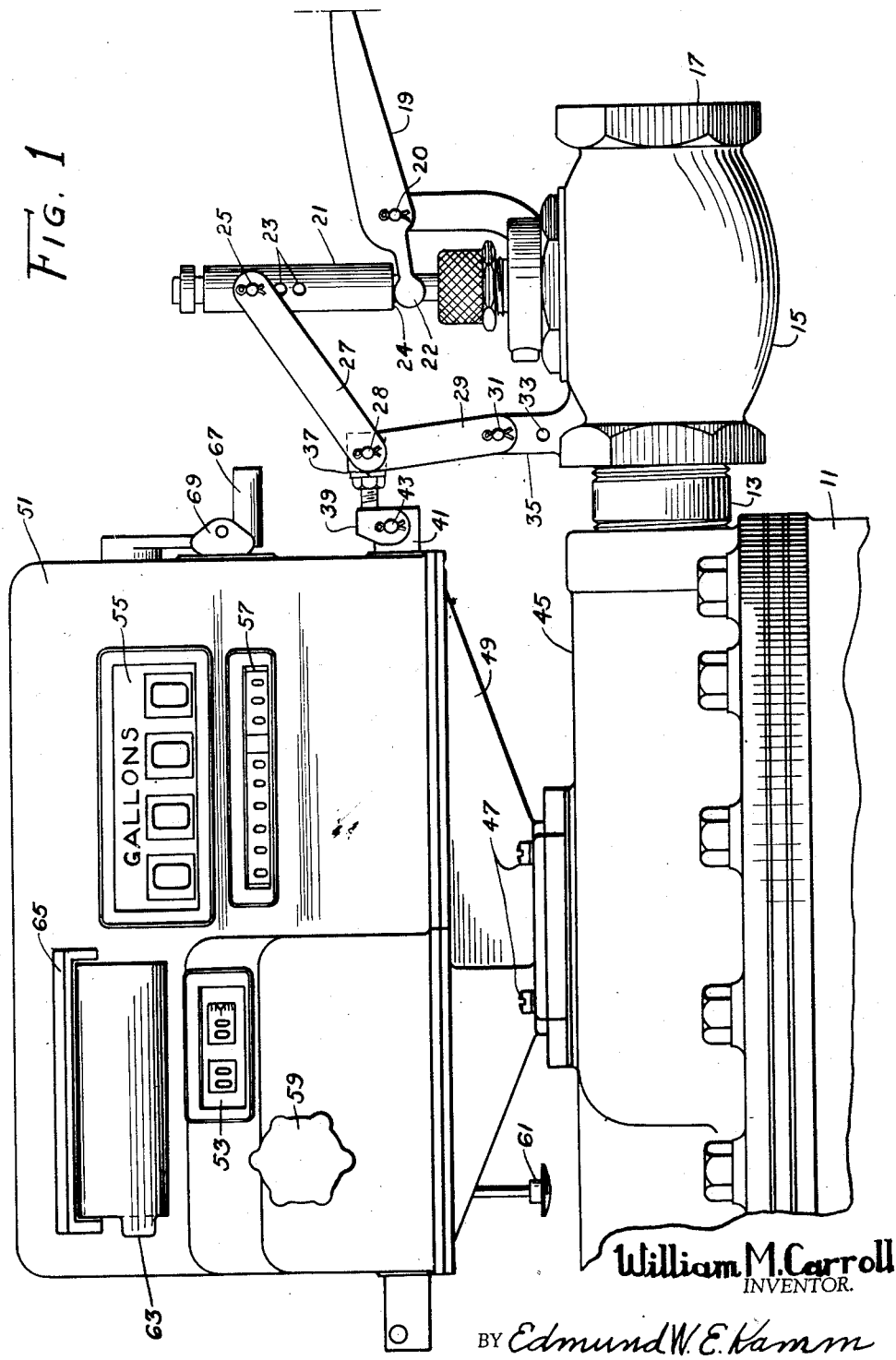
Figure 1 represents a general front elevation showing the relation of the meter, discharge valve, and control mechanism.

The invention relates to a quantity predetermining, ticket printing register adapted for use on tank trucks such as those used for delivering fuel oil, gasoline and other liquids of like nature, although it may be used in other capacities as will be obvious as the description proceeds. In such organizations a meter 11 is usually connected to a control valve 15 by means of a nipple 13, and the valve is connected to an air release mechanism which in turn is connected to the tanks or compartments of the truck. The discharge from the meter is conducted through a check valve to a flexible conduit (not shown) which serves as the discharge conduit. A lever 19 is pivoted at 20 on the valve body and is provided with a yoke 22 which engages a downwardly facing shoulder 24 on the valve stem 21. Said valve stem is provided with a plurality of perforations as shown at 23 for the reception of a pin 25 which serves to support one end of a link 27 for motion with said stem. The other end of link 27 is pivoted by means of a trunnion 28 to one end of a link 29 which is in turn pivotally mounted at its lower end on a projection 35 of the valve body by means of a pin 31 which is retained in one of a plurality of openings in said projection.

The trunnions 28 are fixed to a block 37 which is adjustably mounted by means of threads upon a yoke 39 which is attached to the end of a control bar 41 by means of a pin 43.

Mounted upon the meter cap 45 by means of cap screws 47 is the base 49 of the quantity predetermining, ticket printing register which comprises a mask or casing 51 having windows 53, 55 and 57 through which are visible respectively, the predetermining dials, the volume registering dials and the total volume and operation number dials. The knob 59 serves to adjust the predetermining dials and with knob 61 serves to release the predetermining mechanism as will be described below. A cover 63 is provided to close the entrance to the ticket chute and a projection 65 is provided above the cover to prevent entry of rain, etc. into the clearance slot above the cover. A crank 67 projects through the mask 51 and is operable under certain conditions to reset the volume register and perform other functions which will be described in detail below. The key 69 operates a lock to prevent unauthorized inspection of the total gallons and operations registers to be described.

REGISTER CONSTRUCTION AND DRIVES

*Figures 2, 11, 12, 13 to 16, inclusive, 19 to 24, inclusive*

Figure 2:
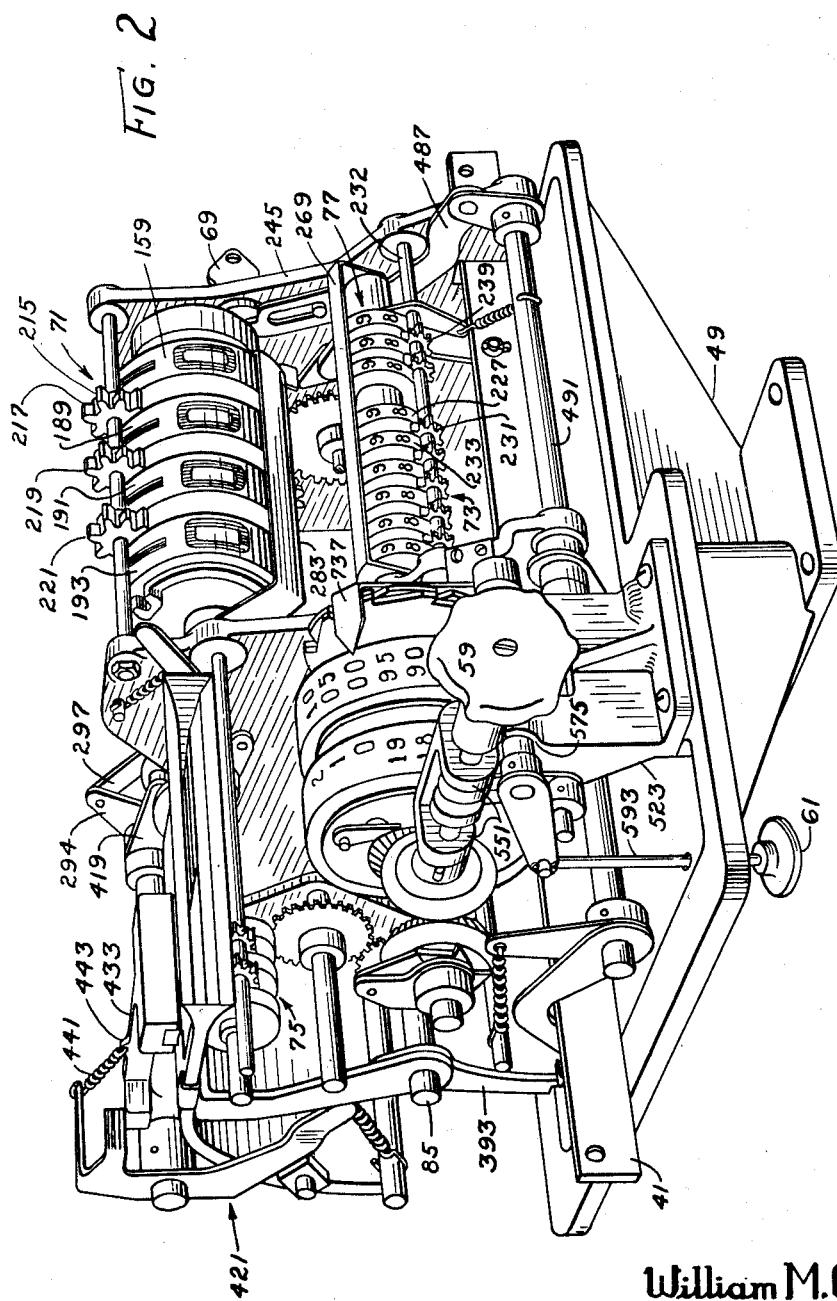
Figure 2 is a perspective view of the recording mechanism with the cover or mask removed and an end wall removed.

Referring to Figure 2, the numeral 71 represents, generally, the volume register which discloses the quantity of fluid dispensed during a single operation while the numeral 73 represents the total volume register which accumulates the total volume of fluid dispensed in a great number of successive transactions. Numeral 75 indicates, generally, the printing wheels which register the same item as the register 71 and are adapted to yield a printed record which conforms with the indication found on register 71 at the end of a dispensing operation. Numeral 77 indicates an accumulator which is advanced one unit upon each operation of the valve for dispensing fluid.

In Figure 13 is disclosed a meter driven shaft 79 which is provided with a worm 81 which in turn drives a worm wheel 83 fixed to shaft 85. A gear 87 is fixed to shaft 85 and through an idler gear 89 it drives the gear 91 which is associated with the lowest or units order type wheel 93 which is mounted for free rotation in one direction with respect to the resetting shaft 95. See Figures 14 and 15.

The gear 91 has pivoted to its inner face 97 by means of a pin 99, the pawl 101 which is urged outwardly into engagement with a fine toothed ratchet 103, which is formed integrally with the wheel 93 by a spring 105 also mounted on the gear face 97. The wheel 93 carries type characters 94. Both the gear and the type wheel are provided with hubs which are adapted to turn on shaft 95.

Mounted externally of the type wheel and fixed thereto for rotation therewith is the Geneva transfer pinion 107 which is adapted to mesh with the Geneva gear 109 mounted on shaft 111 (Figure 13). The gear 109 is integral with a spur pinion 113 which meshes with the gear 115 of the next superior order printing wheel 117 shown in Figures 13 and 16. A pawl 119 is pivoted on the face of gear 115 by means of pin 121 and is urged into engagement with a coarse ratchet 123 by means of a spring 125 also mounted on gear 115. The ratchet is connected to drive the type wheel which also carries a Geneva transfer pinion 127. Both the gear 115 and the type wheel are mounted on hubs which are rotatable on shaft 95. The transfer of motion from type wheel 117 to type wheel 129 and thence to type wheel 131 is accomplished by combined Geneva gears and spur pinions similar to those indicated by the numerals 109 and 113 respectively. The internal structure of the type wheels 129 and 131 is the same as that disclosed in Figure 16 in connection with the wheel 117.

Each of the type wheels is provided with a recess 133 as shown especially in Figure 15, in which are mounted a resetting pawl 135 and a spring 137. The pawl is urged toward shaft 95 by said spring and tends to engage a V-shaped groove 139 which is cut in said shaft for resetting the type wheels as will be disclosed.

In Figures 13, 17 and 18 is shown a disc 141 which is fixed for rotation with the resetting shaft 95 and which carries a plurality of type 143, 145 in a slot 147 extending radially of the disc. A set screw 149 and a shim 151 serve to maintain said type in position in the disc. The type, since they are fixed to the reset shaft, will occupy a position in which they may be struck by the hammer during all printing operations, hence an impression will be taken therefrom each time printing occurs.

The volume register 71 registers the individual transactions and is reset before each succeeding delivery. This register is also driven from the aforesaid meter driven shaft 85 through the intermediary of a gear 153 which is fixed to shaft 85, and an idler gear 155 which meshes with the gear 157 of the lowest order quantity indicating dial 159 shown in Figures 11 and 12. Attached to said gear 157 by means of a pivot pin 161 is a pawl 163 which is urged outwardly by means of a spring 165 to engage a ratchet 167. The latter is mounted on a hub and is clutched to the dial 159 as shown at 169. Formed integrally with the dial is a Geneva transfer pinion 171 having a locking rib 173.

Seated in a recess 175 in the dial 159 is a pawl spring 177 which is adapted to press a pawl 179 which is also seated in the recess, toward a V-shaped groove 181 in the resetting shaft 95 upon which all of the quantity dials in the register are mounted for rotation in one direction; rotation of said dials in an opposite direction is prevented by pawls 179.

A ratchet 185 is also fixed to gear 157 and is adapted to co-act with a pawl 187 to prevent backlash from being taken out of the dial driving train during resetting.

In Figure 2 are shown the superior order volume registering dials 189, 191 and 193, the detailed construction of which is disclosed in Figures 21 and 22. The dial 189 there shown, is exactly the same as the dials 191 and 193.

Mounted on dial 189 by means of studs 195, is an internal ratchet 197. The hub 199 of the dial supports a hub 201 which is fixed to the driving gear 203 and which carries by means of a pivot 204 the pawl 205. The latter is adapted to be forced into engagement with ratchet 197 by a spring 207 to transmit motion to said ratchet in one direction. A recess 209 which is provided in the dial, is formed substantially like the recess 175 (Figure 11) and is adapted to receive a pawl and spring similar to those indicated in Figure 11 by the numerals 179 and 177 respectively. A Geneva pinion 211 and the locking annulus 213 are formed integrally with the dial.

Transfer is accomplished between the dials 173 and 189, first described, by means of a Geneva gear 215 which is driven by the pinion 171. A spur pinion 217 is formed integrally with the gear 215 and transmits motion to gear 203 of dial 189. The latter dial receives a one tenth rotation for each rotation of dial 173 and is locked in its rotated position by the annulus 173 which engages two adjacent teeth of gear 215. Transfers of similar magnitudes are accomplished between dial 189 and dial 191 by the combined Geneva gear and spur pinion 219, while a like transfer is accomplished between dials 191 and 193 by the combination gear 221.

In Figure 25 is disclosed a shaft 225 which is driven from shaft 79, described above, by means of worm 81 and worm gear 223. The lowest order dial 227 of the total quantity accumulator 73 is fixed to rotate with this shaft. A Geneva transfer pinion 229 is fixed to this dial and serves to drive a combined Geneva gear and spur pinion 231 which is freely mounted on a shaft 232 to drive a gear to which is fixed the next highest order dial 233, said latter dial being also mounted for free rotation about shaft 225. The remaining dials are likewise freely mounted on the shaft 225 and are connected by transfer mechanisms which are similar to that just described. These dials are not resettable.

A step by step accumulating register 77 is provided for indicating the number of dispensing operations performed by the printing register. The register 77 comprises a number dial 235 of the lowest order which is mounted for free rotation about the shaft 225 described above (see Figures 23 to 25). A Geneva pinion 237 is formed integrally with said dial and is adapted to drive a combined Geneva gear and spur pinion 239 which is mounted for free rotation on shaft 232 and which drives a gear attached to the counter dial of the next highest order. A spacer 241 is provided between the accumulators 73 and 77 and a rotatable hub 243 is provided between the accumulator 77 and the end frame 245 to maintain the loosely assembled elements in place on the shaft 225.

Formed integrally with dial 235 is a ratchet 247 while mounted integrally with hub 243 for free rotation upon shaft 225 is a pawl carrier 249 to which is pivoted by means of a pin 251, the pawl 253. A spring 255 urges the pawl into engagement with the teeth of ratchet 247.

Also pivotally mounted on the carrier by said pin 251, is a pawl 257 which is urged in a counter-clockwise direction (Figure 23) by a spring 259 but which is prevented from passing in this direction beyond a position substantially in alignment with the center line of the pawl carrier, by an ear 261 which engages the lower edge of said pawl carrier. A stop pawl 263 is mounted for rotation about rod 232 and is biased in a pawl engaging direction by a spring 665.

It is to be noticed with respect to this register that in the number dials of higher orders, the ratchet shown in Figure 24 is replaced with a gear which is adapted to mesh with the spur pinion of the element 239.

The hub and its associated parts are operated by means which will be disclosed below in connection with the quantity predetermining mechanism.

Referring to Figures 2 and 29 it will be seen that pivoted upon shaft 225 by means of ears 267 is a shutter 269 which is adapted to be swung into position over the accumulating registers 73 and 77. An arm 271 is attached to one of the ears and is provided with a slot 273 which is adapted to receive a pin 274 on a depending lever 275. Said lever is attached to an element 277 of a lock 279 which is mounted in a boss 281 on frame member 245.

The lock element is adapted to be rotated by means of a key 69 heretofore described. As the key is rotated in a counter-clockwise direction (Figure 29), the lever 275 is rotated in a similar direction to impart to lever 271 and shutter 269 a rotation in a clockwise direction and the latter will be disposed in a position to cover the associated accumulators against unauthorized inspection.

A shutter 283 (Figures 2 and 5) having ears 285 which are perforated to receive shaft 95 upon which they are adapted to rotate, is provided to cover the quantity indicating register during resetting. A cam 287 is mounted to turn with a cam shaft 288 and is provided with a single notch 289. A pawl 293 is pivoted for free movement about the hammer shaft 292 and is formed with an arm 294 to which is attached, by means of a pivot pin 295, a link 297. The latter is pivoted by a pin 299 to one ear of the shutter at a point below the axis of shaft 95 as is clearly shown in Figure 5. A second link 301 is connected to the pivot pin 299 and to a spring 303 which is anchored to a fixed portion of the machine at 305.

The shaft 95 upon which the quantity dials are mounted is provided with a transverse opening 307 (see Figures 19 and 20) and has fixed to it by means of a key 309 the driven element 311 of a clutch. A control plate 313 is provided with a hub 315 which is adapted to embrace the portion of the shaft containing the opening and a pin 317 of smaller diameter than said opening inserted therethrough and is held in the hub. A pin 319 is fixed in said control plate and extends parallel to shaft 183 to support a roller 321 in a V-shaped notch 323 in the member 311. A spring 325 and its follower 327 are mounted in a recess 329 in member 311 and are adapted to urge said roller 321 in a clockwise direction in Figure 19.

A dished, or shell element 331 serves as the driving element of the clutch and encloses the element 311 in such a manner as to be engageable by the roller 321. A gear 333 is fixed to drive the shell member and is in turn driven from the crank 67 (Figure 8) through the gear train comprising gears 335 and 337. A one way ratchet 68 (Figures 8 and 9) is connected to rotate with the crank 67 and a pawl 70 is pivotally mounted on a portion of a frame member. The pawl and ratchet cooperate to prevent operation of the crank 67 in a counter-clockwise direction (Figure 8).

The control plate is provided with a V-shaped notch 339 having a cam portion 341. A pawl 343 is mounted for free rotation about a shaft 344 and is biased toward notch engaging position by means of a spring 345 which engages an arm 347 of said pawl. A second arm 349 of the pawl is adapted to be engaged by a crank pin 351 which is mounted by means of an arm 353, on the camshaft 288. The latter also carries a cam 290 which operates the pawl 187.

REGISTER OPERATION AND RESETTING

As the meter drives shaft 79 during a dispensing operation, shaft 85 will be driven by means of the gears 81 and 83. Gear 87 rotates with shaft 85 and drives gear 91 on the lowest order type wheel through the idler 89. Gear 91 carries pawl 101 and through the internal ratchet 103 it drives the type wheel 93 in such a direction that pawl 135 rides idly over the V-groove in the resetting shaft 95. Upon each revolution of type wheel 93, a one tenth revolution of the adjacent type wheel 117 is accomplished by means of the Geneva pinion and gears 107 and 109, the spur pinion 113 and gear 115, and the pawl and ratchet 119 and 123. Transfers are made from type wheel 117 to type wheel 129 and from the latter to type wheel 131 in a similar manner.

The rotation of shaft 85 also causes rotation of gears 153, 155, and 157, to the latter one of which is fixed the pawl 163 (Figure 11) which is adapted to drive ratchet 167 and the quantity dial 159 of the lowest order in such a direction that the resetting pawl 179 will ride over the V-shaped groove in shaft 95. For every revolution of this dial, a one tenth revolution is transmitted to the adjacent dial 189 (Figure 21) by means of the Geneva pinion 171 and gear 215, spur pinion 217 and gear 203, and the pawl 205 and ratchet 197. Transfer of rotation from dial 189 to dial 191, and from the latter to dial 193 is effected by means of mechanisms identical with that just described. Due to the provision of the locking flanges 173 and 213 on the dials, the transfer mechanisms will be locked except when a transfer is taking place.

As shaft 79 is turned by the meter during dispensing, shaft 225 is rotated due to the gears 81 and 223. Fixed to rotate with the shaft is the lowest order dial 227 of total quantity accumulator (Figures 2 and 25). This dial is adapted upon each revolution, to drive the adjacent dial 233 one tenth of a revolution by means of the Geneva pinion 229, the combined Geneva gear and spur pinion 231, and a gear on the adjacent dial. All of the dials except 227 are free to rotate on shaft 225 and each dial is driven, by gearing identical with that just described, from the adjacent lower order dial. These dials are not resettable.

As the hub 243 (Figures 23 and 24) is oscillated on shaft 225, the pawl carrier 249 and pawl 253, advance ratchet 247 and consequently, counter dial 235 one tenth of a revolution. Retrogression of the dial when the pawl returns to starting position is prevented by the locking pawl 263 which engages the ratchet 247. The mechanism for causing oscillation of the pawl carrier will be described below. Transfer between the various orders of dials is accomplished by means of the Geneva pinion 237, the combined Geneva gear and spur pinion 239, and a spur gear which is mounted on the succeeding order dial instead of the ratchet 247 which is disclosed in connection with dial 235. This register is not resettable.

In order to reset the type wheels and the quantity indicating dials to zero, it is necessary to rotate crank 67 in a counter-clockwise direction (Figure 8). It requires two rotations of gear 335 to produce one rotation of gear 337 while two thirds of a rotation of gear 337 produces a full rotation of gear 333. Thus two rotations of crank 67 will give ample opportunity for resetting the registers and thereafter perform other functions such as re-cocking the hammer and releasing the control bar for operation by the valve. As the gear 337 begins to rotate, the cam shaft 288 driven thereby, rotates to drive the cam 290 to force pawl 187 into engagement with the ratchet 185 to prevent the removal of backlash from the register driving gear train.

At the same time rotation of crank 353 in a counter-clockwise direction (Figure 19) is effected to rotate pawl 343 in a clockwise direction against action of spring 345. Because of the overhanging cam element 341 on control plate 313, the latter will be given a slight counter-clockwise rotation against the action of spring 325 to rotate the resetting shaft in a reverse direction so as to pick up any reset pawls which may be near the groove in the reset shaft and as the pawl 343 clears the cam, roller 319 will be forced into contact with the driving and driven elements 331 and 311 respectively to render the clutch operative. The motion of the control plate to permit engagement of the clutch as just described, is permitted by its lost motion connection with shaft 95 (Figure 20). The rotation of gear 333 will now be effective to rotate shaft 95 in a clockwise direction (Figures 11, 15, 16,) and the resetting pawls 179 of the quantity register dials and resetting pawls 135 of the type wheels which have not as yet become engaged will be engaged by the groove in the shaft 95 and will be driven to the zero indicating position. When this position is reached pawl 343 will engage notch 339 in the control plate and additional rotation of gear 333 will free the clutch. When the gear 337 completes its rotation the flat side of cam 290 will be adjacent the pawl 187 which will thereupon disengage the ratchet 185. Referring to Figure 5, it will be seen that the cam 287 will also be rotated in a clockwise direction by the described rotation of the cam shaft 288, to initially cam pawl 293 out of notch 289 thus giving it a clockwise rotation which is transmitted by link 297 to the shutter 283 with the result that the latter is raised to cover the quantity register dials. When resetting has been completed and the shaft 288 returns to normal position, the pawl 293 will again engage notch 289 and permit the shutter to be withdrawn by spring 303.

Before the resetting operation may take place however, a ticket must be inserted in the machine to unlock the resetting mechanism. This interlock will now be described.

TICKET CONTROLLING AND PRINTING MECHANISM

*Figures 2, 3, 6, 8, 9 and 13*

At the completion of a dispensing operation the door 63 of the ticket compartment is not locked because the parts involved occupy the positions of Figure 3. The door 63 is pivoted at 355 to the mask or cover 51 and is provided with an inwardly extending arm 357 which carries a sealing flange and ticket deflector 359 and a cam 361.

A lever 363 is pivoted for free rotation about the resetting shaft 95 and one end thereof cooperates with the side of lever 357 and the cam 361 while the other end is fashioned as a locking abutment as shown at 365. This lever is urged in a counter-clockwise (Figure 6) direction by a spring 367 into engagement with a stop 366.

A second lever 369 is pivoted on shaft 95 and extends through a slot 371 in the down curving portion 373 of the ticket chute indicated generally by the numeral 375. This lever 369 carries an arm 377 which is adapted to be engaged by a spring 379 which biases the lever for motion in a clockwise direction about shaft 95. A projection 381 is provided on the upper edge of the lever and is adapted to engage a square projection 383 on the chute supporting bail 385 which comprises a pair of upright members 387 and 389 connected at their upper ends by a cross member 391 upon which is mounted the ticket chute 375. The upright members are mounted for rotation about the shaft 95.

A locking member 393 is connected to lever 369 and is provided with a notched position 395 which is adapted to overlie a bent over end of a lever 397 which is provided to lock the ticket chute in the Figure 6 position during dispensing.

The ticket chute is provided with an enlarged opening 399 to facilitate the entrance of the ticket. Both walls of the chute are cut away as shown at 401 to provide a window like opening which is arranged in a position directly over the type wheel and under the hammer to permit the taking of an impression from the type wheels.

A ticket deflector 403 is fixed to the mask 51 directly beneath the opening therein to assist in guiding the ticket into the ticket chute.

As is disclosed in Figure 6, a spring 405 is attached at one end to the bail 385 and at its other end to a fixed element and is adapted to urge the bail toward the Figure 3 position wherein the bail member 387 contacts a notch 407 in a cam 409 which is mounted for rotation with the cam shaft 288.

The ticket which is indicated generally by the numeral 411 is preferably in the form of a book comprising a plurality of printed forms 413 similar to that shown in Figure 7, interleaved with a plurality of carbon sheets 415. The printed forms are assembled facing downwardly (Figure 3) while the carbon sheets are assembled with the carbon side up. These elements are stapled or otherwise fastened together at their lower ends. This assembled pack is inserted in the chute with the connected end first and with the face of the printed sheets downward. In order to protect the lowermost carbon sheet, a cover 417 is provided.

The hammer operating shaft 292 is journalled in bearings mounted on the frame member of the machine. Fixed to rotate with said shaft are a cam follower lever 419 and a lever 421 to which are attached a hammer actuating lug 423 and a spring support 425. The lever is also provided with a depending arm 427 to which is attached one end of a spring 429. The opposite end of the spring is anchored by being hooked about a shaft.

Freely mounted on shaft 292 is a hub 431 which carries an arm 433 to which, at its outer end, is fixed a hammer element 435. The latter element is provided with a block 437 of rubber or other suitable material which is adapted to take good impressions from type. A lug 439 extends laterally from arm 433 to engage lug 423 described above. Anchored at one end on the support 425 is a spring 441 which at its other end is looped through an opening 443 in arm 433. This spring urges the lug 439 into engagement with the lug 423 to hold the hammer away from the upper opening 401 in the ticket chute. A stop member 445 which is fixed to the frame of the machine by pin 447 engages the depending arm 425 to limit the clockwise rotation of said lever (Figure 13) under action of spring 429.

The cam follower lever 419 is provided with a roller follower element 449 which is adapted to be operated by a two lobe cam 451 which is fixed to rotate with the cam shaft 288 (Figure 13).

Also fixed to rotate with the hammer shaft 292 (Figures 8, 9 and 13) is a depending lever 453 which is provided with a plurality of shoulders 455, 456, 457 and 459. Pivoted for rotation about shaft 344 is a double armed lever 461 one arm 463 of which is bent transversely as at 465 to engage the pawl 257 described above, while the other arm 467 is provided with a projection 469 which carries a pin upon which is anchored a spring 471; a stop ear 473 which is adapted to cooperate with shoulders 455 and 456 on lever 453; a bent over ear 475 which is adapted to cooperate with the shoulder 457 on lever 453; and a projection 477 which is adapted to be contacted and depressed by a roller 351 on arm 353 of the cam shaft 288.

A disc 483 having a projection 485 is mounted for rotation with cam shaft 288 and lies in the same plane as the lever 453. The projection 459 of the lever is adapted to cooperate with said projection 485 to lock the shaft against rotation.

TICKET CONTROLLING AND PRINTING MECHANISM OPERATION

At the end of a dispensing operation and after removal of the printed ticket, the ticket chute and its associated mechanisms occupy positions which are disclosed in Figure 3. To begin another dispensing operation the operator must reset the printing wheels and the quantity register dials by rotating crank 67. Due to the gearing 335, 337, the cam shaft 288 would also be rotated as the crank is turned and therefore cam 409 would be rotated to in turn force the bail 385 to the right in Figure 3. This, however, is prevented due to the locking engagement of the square element 383 with shoulder 381 on lever 369 which is swung into and held in its active position by spring 379 so long as there is no ticket in the machine. Thus it will be seen that it is impossible to reset the registers until a ticket has been inserted.

By lifting the cover 63, the operator may insert the ticket pack 411 as described above and as the latter enters the chute, the leading edge of the pack will engage the end of lever 369 which projects through the slot 371 in the chute and will depress it. This motion of the lever moves the shoulder 381 out of engaging relation with the projection 383. Sufficient motion of lever 369 is required to perform this operation so that when it is effected the ticket will project only slightly from the mask 51.

It will also be observed that when the cover 63 was lifted the lever 357 and cam 361 operated successively to depress and retain depressed, the lever 363 against the action of spring 367 with the result that the abutment 365 was raised into the path of projection 383. Thus even though the projection 383 is released by the insertion of the ticket pack 411, resetting is still prevented so long as the door 63 is raised. When this door is closed however, the locking member will be rotated counter-clockwise under the action of spring 367 in moving lever 363 against stop 366 and there is no obstruction to the motion of bail 385. Resetting may then be accomplished through the mechanism described above.

As the cam 409 is rotated in a counter-clockwise direction (Figures 3 and 6) the bail 385 will swing in a clockwise direction about shaft 85 and the chute 375 will be carried toward the door 63 to the position of Figure 60. In this position the ticket forms are in position so that the lower line (Figure 7) which is opposite the legend "Reading at start of del.," will be in alignment with the type wheels. It is also to be noted that in this position of the bail, the projection 383 overlies the locking member 365 on lever 363 and in turn locks the latter in position against the stop 366. The lever being thus locked against substantial rotation, locks the door 63 against opening by reason of its engagement with the lever 357.

As a further result of the rotation of bail 389, the depending lever 393 is moved beyond the bent over end of the lever 397 and as the latter is raised upon further rotation of crank 67 as will be described, the parts just described are locked in the position of Figure 6 while the cam 409 is returned to its initial position by reason of the fact that shaft 288 makes one full revolution, to clear the way for return of the ticket chute to its initial position approximately at the end of the delivery operation.

Another result effected by rotation of the cam shaft 288 as the ticket chute is rotated, is the lifting of the cam roll 449 and follower arm 419 to rotate the hammer shaft 292 in a counterclockwise direction (Figure 13). As a result of this rotation, the lever 421 is rotated against the action of spring 429 which is the hammer main spring. The hammer is drawn with the lever 421 in its movement by reason of the spring 441 and the first lobe of cam 451 is so located that at the end of that stage of the resetting operation at which the register elements have reached their zero indicating positions, the cam follower 419 will have been completely raised and will have cleared the lobe of the cam so that the hammer mechanism is in condition for a printing operation. It is restrained from such operation however, by reason of the fact that the latch 461 moves into such a position under the action of its spring 471 that its ear 475 engages the shoulder 457 of lever 453.

It is not until lever 353 and its pin 351 (Figure 8) are rotated sufficiently to engage the abutment 477 of lever 461, that the lever 453 is released. At this stage of operation of the mechanism the resetting of the registers will have been accomplished and the zero printing phase will have been reached.

As the lever 461 is rotated by lever 353, the lever 453 will be released to permit a sharp clockwise rotation of shaft 292 and lever 421 (Figure 13) under the action of spring 429. This motion is transmitted to hammer 435 by the coacting projections 423 and 429. Before the striking element contacts the type, lever 421 engages the stop 445 and halts suddenly, while the hammer element continues its motion under the influence of its inertia and against the action of spring 441, to strike the ticket pack smartly against the type wheels to thereby take an impression. The hammer element rebounds immediately from the type wheels and returns to its normal position relative to lever 421, under the action of spring 441.

At this stage the resetting has been completed and the zeros have been printed on the ticket to show the condition of the registers, but the rotation of the cam shaft has progressed approximately only two thirds of a revolution. The remaining one third of the revolution brings the second lobe of cam 451 into operative relation with respect to follower 449 and the latter is again raised to cock the hammer. However, as the cam passes from under the cam follower, the latching lever 461 of Figure 8 will again retain the lever 453 in its actuated position and the hammer will thus be held in position for a subsequent printing operation.

It is to be understood that the lever 453 will occupy a more nearly vertical position than that shown in Figure 8 when the hammer is in the uncocked position.

The main function of the ear 473 on lever 461 is to engage with the shoulders 455 and 456 respectively of lever 456 to maintain the first mentioned lever in proper position against the action of spring 471. At the completion of the second hammer cocking operation, further movement of crank 67 will cause the projection or cam 493 to actuate its follower 495 for a purpose to be described, and thereafter, the projection 485 on disc 483 will come into abutting relation with the shoulder 459 on lever 453 and bring to a conclusion this phase of the cycle by preventing further rotation of the crank and its associated elements.

QUANTITY PREDETERMINING MECHANISM

*Figures 2, 3, 6, 8, 9, 10, 25 to 28 inclusive, 30 to 34 inclusive*

A pitman 487 is pivoted at its lower end (Figures 2, 8, and 26) to an upright lever 489 which is fixed to turn a shaft 491. The upper end of the pitman is formed as a yoke which embraces the shaft 288 (Figure 9) so that the pitman will be guided thereby. A cam 493 is mounted to rotate with the resetting shaft and a follower 495 for the cam is fixed on the pitman.

Fixed to rotate with the shaft 491 are levers 497 and 499 which occupy the same angular position on the shaft, are duplicates in form, and are spaced axially along the shaft. The lever 397 having the bent over ear which cooperates to lock the chute mechanism in its zero printing position is fixedly mounted on the shaft and an upstanding arm 501, also fixed to the shaft, has connected thereto at its outer end a spring 503 which is anchored on a fixed element and serves to bias the arm 501 and shaft 491 in a counter-clockwise direction (Figure 25).

An upstanding pawl 505 is fixed to shaft 491 by reason of its hub 507 being pinned thereto. The pawl has a projection 508 which extends parallel with the axis of shaft 491. Pawls 509 and 511 which are alike in construction, are provided with hubs and are mounted loosely on the shaft 491 so that their hubs are in abutting relation. This arrangement of the pawls causes one to be disposed above and the other below the horizontal plane passing through the axis of the shaft 491 as is shown in Figure 27, so that the projection 508 of pawl 505 may be received between them. Pads 513 are provided on the pawls for engaging the projection. Bentover ears 515, one on each pawl 509 and 511 are perforated to receive the respective ends of a tension spring 517 which serves to draw the pawls toward each other and toward the projection 508. The outer ends of the pawls 509 and 511 lie respectively above and below the edges of the control bar 41 and are adapted to coact with notches 519 and 521 respectively which are formed in the edges of the control bar.

An upright standard 523 (Figure 2) serves to rotatably support a shaft 525 (Figures 26 and 30) to which is pinned an upwardly extending actuating lever 527, the end of which is rounded as shown at 529. Also pinned to said shaft is a clutch member 531 having two clutch faces 533 and 535. An upwardly extending arm 537 is pinned to the end of shaft 525 opposite the lever 527.

Loosely mounted on shaft 525 are a pair of similarly formed bell cranks 539 and 541 having hubs which extend from opposite sides of the levers and which are formed with clutch faces 543 and 545. These clutch faces are adapted to engage the complementary faces of the member 531 on the opposite ends of which they are arranged. The clutch faces are so formed that there will be some lost motion between the bell cranks 539 and 541 and the clutch member 531 as is clearly shown in Figure 34. A spring 547 is anchored at 549 on the member 531 and has its ends hooked under the bell cranks 543 and 545 so that the lost motion mentioned above will be taken up in the clockwise direction (Figure 26). That is, the bell cranks will be retained in their farthest clockwise position (Figure 26) with respect to the member 531 by means of spring 547.

Mounted for rotation and axial sliding motion in bearings 551 of the standard 523, and crosswise of shaft 525 is the shaft 553. This shaft is provided with a handwheel 59 and a pair of collars 555 and 557 which are pinned thereto and are adapted to receive the upper end 529 of the lever 527. The shaft, at its inner end rides freely in the hub 559 of gear 561 and carries a pin 563 which engages a slot in the hub 559 of gear 561 so that rotation may be transmitted to the gear from shaft 553 while axial motion of the shaft independent of the gear is permitted. A spring 565 surrounds shaft 553 and is compressed between collar 557 and the bearing 551 to retain the shaft in its outermost position. As a result of the action of this spring, the shaft 525 is normally maintained in its farthest clockwise position.

The bell crank 539 comprises a depending arm which is notched as at 567 to engage the end of pawl 497 of shaft 491. It also comprises a substantially horizontally extending arm which is provided with a cam follower 569. Similarly the depending arm of bell crank 541 is provided with a notch 571 for the reception of pawl 499 also on shaft 491, and the horizontal arm is provided with a cam follower 573.

The standard 523 also supports in bearing 575 a shaft 577 which is located above and extends parallel to the shaft 525 (Figures 30 and 31). To one end of this shaft is pinned the horizontally extending arm 579 and to the other is pinned the pawl carrier 581. The pawl 583 is pivoted by a pin 585 to the carrier and is urged to rotate in a clockwise direction (Figure 33) by spring 587. This pawl is offset as is clearly shown in Figures 26 and 30 and is provided with an ear 584 which overlies the pawl 505. The pawl carrier 581 is provided with an abutment 589 which is normally overlain by a projection 591 of the lever 537. At the right hand edge (Figure 33) of the abutment, the carrier is cut away so that a slight clockwise rotation of lever 537 will clear the abutment and will permit the carrier to be rotated in a counter-clockwise direction.

Lever 579 mentioned above is provided with a depending link 593 which at its lower end is provided with a button 61 which is disposed outside of the housing or mask.

The control bar 41, shown especially in Figures 26, 27, and 28 is provided with a slide 595 which is mounted on headed pins 597 and 599 which are fixed in the control bar and which extend through slots 601 and 603 respectively in the slide. The slots are enlarged at one end to the size of the pin heads to facilitate assembly of the slide on the control bar. A pin 605 is mounted in the slot of the control bar and a helical tension spring 607 is disposed in a slot 609 in the control bar and is anchored on and extends between the pin and a hole 611 in the slide. The spring serves to hold the slide with the ends of the narrow portions of the slots 601 and 603 in abutment with the pins. The slide is narrower than the bar 41 and lies with its upper and lower edges within the upper and lower edges of the bar so that the notches 519 and 521 will not be barred by the slide proper. However, the slide is provided at its upper edge with a lug or projection 613 which serves to bar entrance of the pawl 509 into the slot 519 when the slide is in its farthest left hand position (Figure 28). The control bar as just described is arranged so that opening of the control valve will move the bar to the right in Figure 26. This quantity predetermining mechanism is described and claimed in my copending divisional application Serial No. 361,417 filed October 16, 1940.

However, it may be necessary or convenient to locate the valve at the left of the predetermining device instead of at the right as shown in Figure 1, and in such case the control bar 41 would be moved left (Figure 42) during the opening of the valve. To meet this condition the slide 595 would have to be reversed, end for end, and the spring 607 would have to be anchored as at 615 to exert its tension on the slide in a right hand direction in Figure 42. Openings 617 and 619 are provided at each end of the control bar so that the valve linkage may be connected to one end or the other thereof.

An elongated slot 621 (Figures 8, 10 and 26) is provided transversely of the control bar 41 to receive a pin 623 which is mounted at the end of a link 625. This link is in turn pivoted by means of pin 627 between the arms of a yoke 629 which is fixed to the frame of the device. The pin 623 also carries the lower end of a link or pitman 631 which at its upper end is connected by a projecting ball shaped journal 633 to the hub 243 of the pawl carrier 249 described above. The control bar 41 is shown in Figure 10 in its extreme right hand position, but when the bar is in its normal position, that is, with pawl 509 seated in notch 519, the link 625 assumes a vertical position.

The links 625 and 631 form a toggle which is adapted to be operated when the control bar moves in either direction from the normal direction. Hence, when the valve is mounted at the left of the predetermining mechanism, the toggle will be actuated to the position shown in Figure 42. In either actuated position of the toggle the hub 243 will be rotated counter-clockwise (Figure 8).

Referring to Figures 3, 25 and 30, the worm gear 223 is provided with a hub 635 which is supported on one end of a fixed shaft 637, said hub being freely rotatable about the shaft. A cylindrical clutch element 639 is mounted on the hub 635 as a journal and is provided with progressively constricted recesses 641 adjacent the face of said hub. Rolls 643 are supported in said recesses and are urged toward the narrowest portions thereof by springs 645. These recesses are so arranged that the clutch element will receive a counter-clockwise rotation (Figure 3) from the worm wheel as it is rotated in this direction by the meter, while a rotation of the element 639 with respect to the hub 635 in the said counter-clockwise direction will be permitted by reason of the release of the rolls from the constricted portion of the recesses as will be apparent from an observation of Figure 3.

Fixed to rotate with the clutch element 639 are the one gallon predetermining disc 647, the emergency ratchet 649 and the planetary spider 651 which carries the planetary gears 653 and 655. A sun gear 657 is fixed to the shaft 637 and the driven sun gear 659 is carried about with the spider 651 in a counter-clockwise direction (Figure 25) while the planetary gearing effects a reduction in this rotation. A disc 661 is fixed to sun gear 659 and carries a pawl 663 which is biased in an outward direction by a spring 665 to engage an internal ratchet 667. The ratchet is mounted on a hub 669 which is rotatably mounted on shaft 637 and which is connected to the gallons predetermining dial 671 by a clutch 673 (see Figure 30).

A gear 675 is fixed to rotate with the dial 671 by means of pins 685, while a cam 679 is also mounted on said pins but is spaced from said gear by a spacing element 677. A blank disc 681 is fixed at the outer end of said pins to provide room for a cam which is inserted in place of the disc when the mechanism just described is used as a two-stage control mechanism which will be described below.

A pawl carrier 683 is mounted for free rotation about a sleeve 684 which rides freely on shaft 637. The pawl carrier is provided with a bent over ear 687 to which is attached one end of a spring 689 which tends to rotate the pawl in a counter-clockwise direction (Figure 25). Said spring is anchored to a relatively fixed shaft. A second bent over ear 691 is adapted to follow a cam 693 which is mounted for rotation about a shaft which is parallel to shaft 673. This cam is fixed to rotate with a gear 695 which is of the same size as and which meshes with gear 675. Thus the cam will be driven at the same speed as dial 671.

A pawl 697 is pivoted on the pawl carrier 683 and has attached to one arm thereof, a spring 699 which is anchored on the ear 691 just described. This spring biases the pawl for counter-clockwise rotation about its pivot (Figure 25).

Also mounted for free rotation upon the sleeve 684 is the hundred gallons dial 701 to which is attached on one side, the transfer ratchet 703 in a position to be engaged by the transfer pawl 697, and on the other side is attached the cam 705. A pawl 707 is pivoted upon the face of the cam 705 and is urged in a clockwise direction (Figure 25) by a spring 709 and into engagement with a ratchet 711 which is fixed to rotate with miter gear 713 upon the sleeve 684.

Keyed on the end of sleeve 684 is a pawl carrier 715 (Figures 30 and 31) upon which is supported by means of a pivot pin 717, the pawl 719. A spring 721 biases the pawl in a counter-clockwise direction (Figure 31) so as to cause it to engage a ratchet 723 which is pinned to a miter gear 725 which in turn rotates freely on the sleeve 684. The miter gears 713 and 725 are constantly in mesh with the gear 561 described above. A spacer 728 maintains the miter gears in proper position.

As is clearly shown in Figure 34 a pawl 729 is pivoted at 731 to the shaft 491 and is biased in a clockwise direction by a spring 733 which is anchored as at 735 to a frame member. This pawl is arranged to engage the transfer ratchet as is shown in Figure 30 to prevent retrogression thereof.

A pointer 737 is fixed to a frame member (Figure 2) and serves to indicate the setting of the quantity predetermining dials 671 and 701.

Considering Figures 25 and 26, it will be understood that the pawls 505, 583, 569 and 573 are arranged to engage the ratchets 647, 649 and cams 679 and 705 respectively in the order named.

Further it is obvious from a comparison of Figures 25 and 30 that the ratchets 711 and 723 will be effective to drive their cooperating pawls when the driving gear 561 is turned counter-clockwise and clockwise respectively in Figure 2.

QUANTITY PREDETERMINING MECHANISM OPERATION

Taking up the operation of the device at the point where the resetting and cocking of the hammer have been effected, it will be seen that before the lug 485 and the projection 459 (Figure 8) engage to stop the operation of the resetting crank 67, the cam 493 comes into engagement with the follower 495 on pitman 487 to give it a motion downward and to the right in said figure, with the result that lever 489 and shaft 491 are given a clockwise rotation. The cam thereafter clears the follower so that a return motion of the pitman may follow.

It follows from this rotation of shaft 491 (Figure 26) that the pawl 505 will be drawn away from ratchet 647 and the levers 497 and 499 will be rotated so as to be in position to seat themselves in the notches 567 and 571 of the bell cranks 539 and 541 which will be given a clockwise rotation by spring 547 to engage and hold the levers as soon as the quantity predetermining dials are set. The rotation of pawl 505 will lift pawl 509 out of notch 519 in the control bar 41 and throw the pawl 511 into resilient engagement with the lower edge of said control bar preparatory to entering one of the notches 521. As pawl 509 is lifted, the slide 595, which has previously occupied a position to the right of its home position by reason of its having been displaced when the control bar 41 moved to the left relative to pawl 509 in closing the valve, is now moved to the home position under the action of spring 607 to bring projection 613 under pawl 509 to prevent its reseating itself in the notch 519. This would be the case if the quantity dials have not been set, because, until the quantity predetermining dials and the cams 679 and 705 are displaced, the bell cranks 539 and 541 are prevented from rotating to engaging position with respect to levers 497 and 499. Therefore, as cam 493 rides by the follower 495, the pitman would permit a reverse rotation of shaft 491 with the result that the pawl 509 would re-occupy notch 519. The machine would then be locked up so that no further operation could be had without removing the cover and tripping the hammer mechanism so as to clear projection 459 on lever 453 from the lug 485, Figure 8.

Of course, if the quantity predetermining dials have been previously set, the levers 497 and 499 will immediately be engaged by the latch arms of the bell cranks as shaft 491 is rotated the required extent, and in this case, although the slide functions as described, its services are superfluous.

The described rotation of shaft 491 also serves to rotate the lever 397 to the position shown in Figure 6 so that when the cam 409 returns to its initial position, the ticket chute will be locked in its forward position in which the door 63 is maintained locked. As will be apparent, this rotation of the shaft 491 is in opposition to spring 503 which operates on the lever 501 which is fixed to the shaft.

Should the valve be opened before the predetermining dials and cams are moved from their zero positions, it will be seen that pawl 509 will ride off from projection 613 and the shaft 491 will rotate so as to relieve the pressure of pawl 511 against the under side of bar 41. Accordingly the pawl 511 will not seat in notch 521 and the control bar will move to the left to permit the valve to close as soon as pressure is relieved from the valve lever. The motion of bar 41 will cause a printing of the ticket and it will be necessary to insert a new ticket and reset again.

Setting of the quantity predetermining dials is effected by rotating the knob 59. It will be seen from a consideration of Figures 30 and 31 that a rotation of this knob to the right or clockwise will cause a clockwise rotation of ratchet 723 through the miter gears 561 and 725. Such motion will be transmitted through ratchet 723 to the pawl 719, carrier 715, key 727 and sleeve 684 to the gallons predetermining dial 671. Since the direction of rotation is such as to cause the ratchet 667 to ride past pawl 663, the dial will rotate free of the planetary gear set. A rotation of the knob 59 in the opposite or left-hand direction will result in a counterclockwise rotation (Figure 25) of miter gear 713 and ratchet 711 which is transmitted by pawl 707 to the hundred gallons predetermining dial 701. Since the direction of rotation of the dial is such as will cause pawl 697 to ride idly over ratchet 703, the dial will turn free of the transfer mechanisms. The amount of rotation of these dials is gauged by the markings thereon when observed with respect to the indicator 737. The cams 679 and 705 being fixed to the dials with respect to their followers 569 and 571 are displaced by an amount which corresponds to the readings on the dials opposite the indicator. Setting of either dial is independent of the other because the pawl and ratchet connection between them and the miter gears is adapted to transmit power in only one direction.

All is now in readiness for dispensing which may be accomplished by depressing the valve lever 19 (Figure 1). This results in an upward displacement of the valve stem 21 against the action of the valve spring which is compressed thereby and in a corresponding opening of the valve. The upper end of link 27 will be raised in response to the lengthening of the distance between pins 25 and 31 with the result that the links 27 and 29 will tend to come more into alignment and the pivot 28 will be moved to the right to draw control bar 41 in the same direction a sufficient distance to permit pawl 511 to snap into notch 521 in the lower edge of bar 41 under influence of spring 517 (Figures 27 and 28).

This rightward motion of bar 41 results in a rightward motion of the toggle pin 623 (Figure 10) to collapse the toggle 625—631 and rotate the hub 243 in a counter-clockwise direction (Figure 8). The pawl 257 which moves with the hub, passes freely over the end 465 of lever 463 and resumes its extended position as shown in Figure 23. At the same time the pawl 253 serves to turn the ratchet 247 of the operations counter the distance of one tooth to advance the units dial of the counter by one unit.

Opening of the valve causes a flow of fluid through the meter and a consequent rotation of the shaft 79, worm 81 and worm wheel 223 in a counterclockwise direction Figure 3. The rolls 643 which normally occupy a position in the restricted portion of the recess 641, transmit rotation from the hub 635 of the worm wheel to the clutch element 639 and consequently to the ratchets 647 and 649 and to the planetary spider 651 and gears 653 and 655. The latter drives the sun gear 659 in the same general direction as that of the spider at a speed which is reduced by the co-action of the fixed sun gear and the planetary gears 653 and 655. The rotation of the sun gear 659, which is counter-clockwise (Figure 25), is transmitted to the disc 661 and pawl 663 and thence to the internal ratchet 667 which is clutched to the gallons dial 671.

The gear 675 on this dial drives a gear 695 and its attached cam 693 at the same angular speed as dial 671 and the cam serves to give the pawl carrier 683 and consequently the transfer pawl 697 an intermittent oscillatory motion. The cam is so timed with respect to the dial 671 that the cam follower 691 will ride off the crest of the cam at the time the indicator 737 indicates a quantity between zero-zero and ninety-nine (00 and 99). At this time, the pawl carrier and pawl 697 will be rotated counter-clockwise (Figure 25) by the contraction of spring 689 and will advance the hundred gallon dial one unit in the same direction; the unit in this case represents one hundred gallons. During the ensuing revolution of dial 671, the rise portion of cam 693 will rotate the pawl carrier in a clockwise direction so that pawl 699 may pass over a tooth of ratchet 703 preparatory to again advancing the dial 701 at the next transfer.

It is to be noted that the dials 671 and 701 advance in a subtracting direction. That is, the gallonage to be dispensed is set up on these dials at the beginning of the operation and where dispensing is complete, they will register zeros. As the dials approach the zero positions, the cams 679 and 705 approach the followers 569 and 573 respectively and finally when the hundred gallon dial reaches zero the bell crank 541 will be rotated against the action of spring 533 to the extent of the lost motion in the clutch connection to release lever 499, but no rotation of shaft 491 is effected until the gallons dial 671 approaches within one gallon of its zero position whereupon the bell crank 539 is rotated to free lever 497. As a result of the unlatching of levers 497 and 499, shaft 491 will rotate in a counter-clockwise direction under influence of spring 503 until pawl 505 rides upon one of the high portions of the ratchet 647.

The rotation of shaft 419 is sufficient to drop lever 397 from its blocking position behind lever 393 (Figure 6) whereupon spring 405 will become effective to throw the ticket chute to the Figure 3 position to bring the zone of ticket 413 entitled "Gallons delivered" over the type wheels.

Then, as the pawl 505 drops into the next notch of ratchet 647 which is advanced by the meter, the shaft 491 returns to its extreme counter-clockwise position (Figure 26) to resiliently force pawl 509 against the upper edge of the control bar 41 and to force pawl 511 out of notch 521 to permit the valve spring acting through the valve stem 21 and links 27 and 29, to force the control bar to the left in Figure 26. Pawl 509 will be engaged by the projection 613 of slide 595 and the control bar will continue to move relative to the latter two elements until notch 519 is uncovered and pawl 509 seats therein.

This leftward motion of bar 41 causes the toggle 625—631 (Figure 10) to straighten and rotate the hub 243 in a clockwise direction (Figure 8). The pawl 253 will ride freely over a tooth of ratchet 247 which is held against retrogression by pawl 263 (Figure 23) while the pawl 257 (Figure 9) being held against counter-clockwise rotation with respect to pawl carrier 249, will engage ear 465 and turn lever 461 about shaft 344. This results in the freeing of lever 453 for a clockwise rotation under the action of the hammer spring 429 to cause the taking of an impression from the type wheels.

The swinging of the ticket chute back to the position of Figure 3 served to unlock the closure 63 so that the ticket may be withdrawn.

EMERGENCY RELEASE OF PREDETERMINING MECHANISM

The above description covers the normal operation of the predetermining mechanism but emergencies occur which will not permit the completion of the cycle in the normal manner. Specifically, if the customer's receptacle overflows or if the truck tank becomes empty before the predetermined quantity has been dispensed, it will be necessary for the operator to manually control the closing of the valve and printing of a ticket the same as would have been effected automatically under normal conditions.

For this reason the shaft 553 upon which hand wheel 59 is mounted is provided with an endwise or axial motion. By pushing in on this shaft, a counter-clockwise rotation (Figure 26) of shaft 525 is effected. The clutch member 531 thereupon rotates the bell cranks 539 and 541 cranks in the same direction as they would normally be rotated by the predetermining cams 687 and 705 to release levers 497 and 499, so that shaft 491 may be rotated as described above to throw pawl 505 into engagement with ratchet 647. Dispensing will then be terminated and the ticket will be printed in the usual manner when the complete gallon then being dispensed has been dispensed.

However, in cases where it is impossible to deliver the whole of the last gallon, it is possible to terminate dispensing by pushing in on the control knob as just described and in addition pushing up on the knob or button 61, Figure 32. The rotation of shaft 525 which results from pushing in of knob 59, causes a rotation of the locking pawl 537 (Figure 33) to a position in which the ear 591 is clear of abutment 589. This frees the pawl carrier 581 for a counter-clockwise rotation which results from an upward push on button 61 and the consequent rotation of lever 579 and shaft 577. The pawl 583 which is normally held out of contact with the teeth of the ratchet 649 by the contact of its ear 584 with the back of pawl 505 will now engage one of said teeth and will rotate the ratchet 649 as well as ratchet 647 and clutch element 639 (Figure 3) relative to the hub 635 of worm gear 223 in a counter-clockwise direction until a notch in the ratchet 647 coincides with the pawl 505 whereupon the complete reverse rotation of shaft 491 will be effected with the result that the ticket will be printed and released and all of the other functions attendant upon a normal termination of operation will follow.

However, it is only in the case where pawl 505 is in contact with the periphery of the ratchet 647 that the pawl 583 will be effective to engage ratchet 649 because of the fact that when pawl 505 is moved away from its ratchet, the pawl 583 is held so far from its ratchet that no operation of button 61 is sufficient to cause engagement of this pawl with its ratchet.

It will be noted that the operation of this mechanism will be substantially the same as that described, when the control valve is located at the left end of bar 41. The only resulting differences are that the bar 41 will move right in closing; the slide 595 will move to the right to block pawl 509 and the right hand notch 521 will be engaged by pawl 511 instead of the left hand notch. The toggle mechanism will also be operated in a reverse direction.

GENERAL OPERATION OF PREFERRED FORM

In order to perform the protective functions recited in the objects of the invention, it will be seen that the completion of the various events of the cycle in a predetermined sequence is enforced, with optional variations in the cycle being permitted to give flexibility of operation without a sacrifice of the protection afforded by the mechanism.

Thus the first intended operation in the cycle is the insertion of the ticket in the chute. Should the operator deviate from the outlined procedure and attempt to depress the valve handle, his effort will fail because at this stage, the pawl 59 (Figure 20) is seated in the notch 519 of the control bar 41 and the latter would not move. Should he attempt to rotate the resetting crank 67, he will find that it is locked due to the locking of cam shaft 288, cam 409 and ticket chute bail 385 by the ticket operated lever 369.

Rotation of the setting knob 59 is permitted because no harm can be done by merely setting the predetermining dials and cams at any stage of operation. An inward thrust on the setting knob will do no more than to rock the shaft 525 without effect because levers 497 and 499 have not as yet been latched in actuated position by the bell cranks. Similarly, the combined operation of knob 59, as just described, and the knob 61 will be without effect since the pawl 583 will advance its ratchet a portion of a step, or several steps on repeated operations of knob 61 to produce the same result that would be produced by a rotation of the knob 59, namely an adjustment of the predetermining dials and cams although in this case such adjustment comes through the planetary gearing. There is no operation of the type wheels or gallons register because the meter is not actuated.

The closure 63 is unlocked and invites the insertion of the ticket which is the intended operation.

The second intended phase of the cycle is the zero setting and zero printing stage. The mechanism is conditioned for these operations when the inserted ticket depresses lever 369 (Figures 3 and 6) out of the path of the ticket chute bail and after the door 63 has been closed to lower abutment 366 out of the path of said bail.

Operation of the other operable elements such as knobs 59 and 61 and the valve lever 19 will produce no effects other than those which they produced when they were operated during the preceding phase of the cycle, hence it is impossible for the operator to carry out anything but the intended operation or to accomplish the setting of the quantity predetermining dials.

As the intended operation is carried out, the ticket chute is moved to lock the closure 63 to prevent the removal of the ticket. The locking position of the chute is maintained until the shaft 491 receives its initial return rotation near the end of the dispensing operation, to bring pawl 505 into cooperative relation with its ratchet 647.

During the resetting operation, the shutter 283 moves to cover the gallons register dials and does not clear them until the operation of the crank 67 is nearly complete. As the resetting phase is completed, the hammer 437 takes an impression from the type wheels to show the positions occupied thereby at that stage, to prove to the customer that resetting was actually effected.

Further operation of the crank 67 then resets the hammer for a succeeding operation and thereafter the cam 493 operates the pitman 487 to rotate the shaft 491 to set or cock the predetermining pawl mechanism and to free bar 41 for motion when the valve lever 19 is depressed. The same operation of the shaft 491 serves to bring the pawl 397 into bail locking position so that the cam 409 (Figure 6) may rotate to its initial position in which it releases the bail 385. Just as the latter event occurs, the cam 493 (Figure 8) clears its follower 495 to condition the pitman for a return operation and at the same time the projection 485 meets projection 459 of the lever 453 to prevent further operation of crank 67.

At this stage of operations, the knob 59 may be rotated to set the predetermining dials or pushed inward. The latter motion will have no effect because even if bell cranks 539 and 541 are rotated to release levers 497 and 499, the shaft 491 will be held in operated position by the co-action of pawl 509 and projection 613 of the slide 595. Operation of knob 61 in conjunction with inward motion of knob 59 will have no effect because in this condition of the mechanism, the pawl 583 is held out of contact with its ratchet 649 by the co-action of the ear 584 and pawl 505.

The only operations which can be performed therefore, are setting of the predetermining dials and the opening of the valve by depressing the lever 19. The corresponding operation of the control bar 41 causes an actuation of the operations counter as was described above.

At the termination of dispensing either by the automatic or the manual means, an automatic shifting of the paper chute and a printing operation of hammer 437 take place. These operations being beyond the control of the operator serve to eliminate the effects of forgetfulness either voluntary or otherwise and insure to the customer a full printed record of the delivery.

The printing of such a record and the counting of each cycle of operation of the mechanism provides the dealer with a check upon the honesty of the operator because unless the latter turns in a number of tickets which corresponds to the number of cyclic operations of the mechanism registered by the counter 77, the dealer will know that there has been an unauthorized operation of the device.

The unlocking of door 63 occurs substantially simultaneously with the printing operation so that there is no chance to remove the ticket before it has the record of the type wheels imprinted thereon.

As a further checking feature, the total gallons recorded on one day's tickets must coincide with the difference between the start and finish readings of the register 23.

In order to eliminate confusion between tickets taken on the various machines of a fleet of tank trucks, the identification element 147 prints its symbol such as, for example, "2E," upon each ticket as is shown in Figure 7.

MODIFIED QUANTITY PRINTING MECHANISM—
FIGURE 35

In some instances as where the predetermining mechanism is installed to register and deliver predetermined quantities to tank trucks and bulk stations and to perform other similar services, it is desirable that only one ticket be issued for each truck loaded. The truck may be fitted with a plurality of compartments each of which is to receive a predetermined quantity of fluid and to fill these tanks requires a series of cyclic operations of the predetermining mechanism. Since the total gallonage dispensed over a series of predetermining operations is desired, resetting of the type wheels and the counters after every operation of the series is not permissible.

To adapt the device for uses of this kind, applicant has placed final printing operation under the control of the ticket door 63 instead of the valve closing mechanism. To accomplish this object, the lever 46 (Figure 8) and the pawl 257 are omitted and a lever 739 which is formed with the same cooperative elements as the lever 461 except for the arm 463 and its bent over end 465, is substituted on the shaft 344. Instead of rotating freely on the shaft 344, the lever 739 is pinned to one end thereof and at the other end of the shaft is pinned a lever 741. The door locking lever 363 which is pivoted on shaft 95, is provided with an additional arm 743 which carries a pin 745. The latter underlies the arm 741 and as the lever 363 is depressed to the figure 3 position by the opening of door 63, the shaft 344 will be rotated clockwise in Figure 35 to give to the lever 739 a rotation which is the same as that given to the lever 461 (Figure 8) by the pawl 257 upon closing of the control valve in the first described form.

Zeroes will be printed upon the ticket at the end of the resetting operation in the normal manner but at the end of the resetting operation the shaft 491 is not automatically rotated because if a plurality of operations of the control bar are to be permitted while only one resetting operation is to be effected, obviously the shaft 491 must be placed under manual control. This is done by extending the shaft 491 through the mask 51 for the reception of an operating lever similar to that shown in Figure 38.

Also since the total printing will occur as soon as the door 63 is opened, there is no need for locking the door shut. For this reason the locking lever 397 which was provided to engage the ticket chute bail 385 is omitted.

MODIFIED QUANTITY PRINTING MECHANISM OPERATION

The cycle of the modified form just described will be initiated by the insertion of a ticket in the ticket chute and closing of the door. This unlocks the resetting mechanism as in the preferred form of mechanism, and resetting may be effected. There is however, nothing to enforce operation of the resetting mechanism ahead of the opening of the valve because the operation of shaft 491 is now manual instead of automatic.

Assuming however, that the intended order has been followed, the resetting operation will, when completed, be attended by a zero printing operation of the hammer and further rotation of crank 67 will cause a recocking of the hammer and an unmasking of the volume register dials.

In order to release the control bar for operation by the valve lever, it is necessary to rotate shaft 491 by the hand lever and such operation will effect a cocking of the bell cranks 539 and 541 and pawl 505.

Prior to opening the valve, it is necessary to set the predetermining dials 671 and 701 with their respective cams 679 and 705 otherwise the valve will close as soon as measure on the valve lever is released. Thereafter, by opening the valve the control bar will be latched in its displaced or operating position by pawl 511 which engages in notch 521.

The predetermining mechanism functions in the manner described above to release the pawl 511 when the set predetermined quantity has been dispensed and the valve will accordingly close. No printing operation will follow however and by again setting the predetermining dials, rotating shaft 491 and again opening the valve, another predetermined quantity of fluid may be dispensed. A series of dispensing operations may thus be performed until at last, at the completion of an operation when the ticket door 63 is raised, the total quantity of fluid dispensed during the series of operations which is recorded on the type wheels, will be printed on the ticket which may then be removed.

TWO STAGE VALVE MECHANISM

Figures 36, 37, 38, 39, 40 and 41

The problem of two stage valve operation confronts equipment of the type to which this invention relates especially in bulk delivery station work such as that mentioned in connection with the immediately preceding sections of this specification.

Generally, larger meters and pipe lines are used in this work and as a result of the greater output of the equipment, problems of damage by "water hammer" rise when flow valves are abruptly closed.

To take care of such conditions, applicant has provided a predetermining mechanism and a valve controlling linkage to effect closure of the flow valve in two stages. The control mechanism of Figure 38 may be substituted for the control bar mechanism shown in Figure 26 and may be operated automatically as in the preferred form, in which instance the lever 397, pitman 487 (Figure 26) and the hammer tripping lever 463 with pawl 257 would form parts of the organization.

Or, since this type of control mechanism is more commonly used under conditions where the ticket door printing control and the manual operation of shaft 491 are more to be desired, the elements mentioned above which render the device completely interlocked may be omitted and the door control mechanism described in the two immediately preceding sections may be used and the manual operator for shaft 491 may be supplied.

Referring then to Figure 38, it will be seen that the shaft 491 has fitted to the end which protrudes beyond the mask, a crank 747. A pawl 749 is fixed to rotate with the shaft and is adapted to cooperate with the gallons predetermining ratchet 647. Also mounted to rotate freely upon the shaft 491 are the pawls 751 and 753 which are adapted to engage the lower edge of the control bar 755. Arms 757 and 759 are fixed to rotate with shaft 491 and are adapted to be latched by the depending latch arms 761 and 763 respectively of the cam followers 765 and 767. A lever 769 is also pinned to shaft 491 and has attached to it at its outer end the spring 771 which is anchored to a fixed element.

The shaft 525, levers 527 and 537, clutch element 531 and the connection between the latter and the cam follower are all formed and all operate exactly as described in connection with the first described form of the apparatus and therefore it is not deemed necessary to again describe them.

Pawls 773 and 775 rotate freely upon shaft 491 and lie on opposite sides of a bent lever 777 of pawl 749. They also overlie opposite edges of the control bar 755. A spring (not shown) draws the two pawls toward the edges of pawl lever 777 and they are controlled by the motion thereof. A fixed guide plate 779 receives the end of pawl 773 in a slot so as to assist it in bearing the load of the valve spring. Rollers 780 and 782 lie on opposite sides of another slot in the guide plate and serve to assist pawl 775 in supporting its loads and to promote ready withdrawal of said pawl from its notch in the control bar. An elongated notch 781 is provided in the lower edge of control bar 755 for cooperation with pawl 775, while a notch 783 just large enough to receive pawl 773 is provided in the upper edge of the bar.

An adjustable stop plate 784 is fixed by means of screws 786 which pass through elongated slots 788 in the bar and threadedly engage in the control bar, the edge 790 of the stop plate overlies the elongated notch 781 and serves as an adjustable abutment which is adapted to cooperate with pawl 775 to regulate the position which the valve assumes during the second stage of operation and thereby controls the rate of flow during second stage operation.

A spring 785 is attached at one end to the stop plate and is anchored at its other end to a fixed portion of the machine.

Pawl 753 is provided with an upward extending projection 787 which lies directly beneath the cam follower 767. This pawl has attached to its outer end a spring 789 which urges said pawl into engagement with the lower edge of control bar 755.

A bent lever 791 is mounted for rotation with shaft 525 and lies transversely below cam follower 765 and above pawl 751 and is in constant contact with the latter element and will transmit any counter-clockwise rotation of said shaft to it (Figure 36).

The pawl 751 is provided with an upwardly extending cam follower 793 which is adapted to be operated by the cam 795 (Figure 36). A spring 797 urges the pawl 751 into contact with the edge of the control bar and urges the follower 793 into contact with cam 795. The cam 795 is inserted in place of the blank disc 661 described above. Notches 799 and 801 are provided in the lower edge of the control bar 755 for the reception of pawls 751 and 753 respectively. The guide plate 779 extends along bar 755 a sufficient distance to receive and guide the ends of pawls 751 and 753 in notches which are in alignment with notches 799 and 801. Rollers 800, 802 and 804 are mounted on the guide plate and project into the notches 799 and 801 to support the pawls 751 and 753 so as to facilitate the withdrawal of the pawls from the notches.

A different type of valve and linkage than that disclosed in Figure 1 is necessary where it is desired to have a two stage closure of the valve.

The valve itself comprises a body 803 having an inlet 805, valve ports 807 and 809 and an outlet 811. A valve stem 813 is guided in a cap 815 of the valve, and is provided with a piston 817 on the lower surface of which is mounted a facing 819 which is adapted to contact a valve seat 820. The piston thus serves as a valve for the port 809. A piston valve 821 is provided on rod 813 at a distance from the facing 819 which distance is maintained by a spacer 823. A nut 825 maintains the piston, facing, spacer and valve against a shoulder 827 on the rod. A spring 829 abuts the cap 815 and the piston 817 and tends to maintain the latter in its lowermost position.

A cylinder 831 is formed in the cap 815 for the reception of the piston 817 and a vent tube 833 leads from the cylinder to the outlet 811. An adjustable member 835 is provided which will serve to regulate the effective size of the orifice leading to the vent tube to thereby regulate the flow of fluid therethrough. An opening 837 passes through the walls of the cylinder and connects the cylinder with the tube at a point beyond the restriction effected by the member 835. This opening is adapted to be covered by the skirt 839 of the piston when the piston occupies any position in the first stage of its closing travel except substantially its lowermost position in this stage. At or slightly before the valve comes to rest at the partly open position, the skirt uncovers the opening 837 so that thereafter flow of fluid from the cylinder will be substantially unrestricted.

An upstanding projection 841 is attached to the valve cap 815 and at its upper end a pair of link members 843 are pivoted by means of a pin 845. These link members are pivoted at 844 to a pair of depending curved links 851. These sets of links are adapted to embrace the valve stem and to contact one or the other of collars 847 and 849 which are fixed to said stem.

The links 851 at their lower ends support trunnions 853 which are mounted on a collar 855. This collar is adapted to adjustably receive one end of a thrust rod 857 which is attached by means of a clevis 859 to the end of the control bar 755.

Between links 851 and collar 855 on each side thereof are located upwardly extending cam members 861 which are provided with an upwardly extending inclined cam surface 863, (Figures 39 to 41) a stop shoulder 865 and a stop shoulder 867.

A grooved boss 871 is provided on the valve cap 815 for the purpose of supporting the fulcrum standard of the valve operating lever 873. The latter is provided with a yoke bearing arms 875 and 877 which are adapted to engage under the collar 849 on the valve stem. A stuffing box 879 is provided to seal the opening in the valve cap through which the valve stem passes.

Two Stage Valve Mechanism—Operation

At the beginning of a series of operations of this device the operator will insert a ticket into the ticket chute so that the resetting means may be operated in the manner described above to reset the volume register dials and printing wheels, to print the zeros on the ticket and to cock the hammer for a succeeding printing operation. It is understood that since there is no interlock between the resetting mechanism and the shaft 491, the just described operation is optional and not required.

After resetting has been accomplished, the operator will first set the predetermining dials by means of knob 59 and then rotate shaft 491 clockwise (Figure 38), by means of lever 747. The pawl 749 is thereby withdrawn from its ratchet; the pawl 773 is withdrawn from its notch 783 in the control bar; and pawls 757 and 759 are rotated downwardly to be engaged and held by the depending notched arms 761 and 763 of the bell crank. Pawl 775 is also thrown into and resiliently held in engagement with the lower edge of the control bar. Pawls 751 and 753 are continually held in position against the lower edge of the control bar by springs 797 and 789. The cam followers 765 and 767 are, at the time the arms 761 and 763 engage the pawls on shaft 491, brought into engagement with cams 679 and 705 of the predetermining mechanism.

Upon depression of the valve lever 873 (Figure 39) the valve rod will be lifted because of the engagement of the fingers 875 and 877 underneath collar 849. The valve 819 will be lifted from seat 820 and piston valve 821 will be raised beyond the ports 807. Skirt 839 of the piston will be raised so that it covers the opening 837 and spring 829 is compressed. The valve is thus opened and a flow of fluid through the valve and meter is initiated.

At the same time that the valve is opened, the collar 849 contacts the joint 844 of the links 843 and 851 with the result that the collar bearing end of rod 857 is drawn upwardly and the trunnions 853 are drawn into contact with and along the cam 863. The control bar 755 is drawn to the right in Figure 39 and pawls 751, 753 and 775 are drawn into notches 799, 801 and 781 respectively by their cooperating springs. These pawls serve to latch the bar in its right hand position and upon release of pressure on valve level 873. the trunnions will rest upon the shoulder or step 865 as is clearly shown in Figure 40.

Dispensing of liquid being thus initiated is continued without operation of the control mechanism until cam 705 (Figures 30 and 37) contacts the follower 767 (Figure 38), whereupon the latter will be depressed to free pawl 759 from the restraint of notched lever 763, and whereupon the projection 787 of pawl 753 will be contacted by the lever of follower 767 and the latch pawl 753 will be withdrawn from its notch 801 in the control bar.

Dispensing is continued until all but approximately 25 gallons of the predetermined quantity have been dispensed, whereupon cam 795 (Figure 36) contacts and depresses cam follower 793 and this causes the withdrawal of pawl 751 from notch 799 from the control bar and frees it for a left hand or valve closing motion under the action of springs 785 and valve spring 829. The pawl 775 rides in the elongated slot 781 until it contacts the end 790 of the adjustable stop plate 784.

The leftward movement of the control bar is accompanied by a leftward movement of trunnion 253 which ride off from the step or shoulder 865 and permit the valve rod 813 to lower under control of the dashpot until the trunnions contact the lowermost step 867 of the cam elements 861.

Since the skirt 817 of the piston covers port 837, the valve is controlled in its downward motion by the rapidity with which fluid enters the cylinder 831 through the restricted orifice. Upon the skirt of the piston falling below the orifice, the downward movement will be substantially unrestrained. Thus preparation is made for a quick stopping of the flow when the next operation of the control bar occurs.

When the cam 679 (Figures 30 and 36) comes into contact with its follower 765, the latching lever 761 (Figure 38) will be withdrawn from contact with lever 757 and shaft 491 will be rotated in a counter-clockwise direction (Figures 36 and 38) to release pawl 775 from its engagement with the end 790 of the stop plate 784 and to bring pawl 773 into contact with the upper edge of the control bar preparatory to engaging with notch 783.

The release of control bar 755 from the restraint of latch pawl 775 permits the final left hand motion of said control bar under the action of spring 785 and the valve spring 829 and the valve, being uncontrolled by the dashpot, will close quickly. During this operation the trunnions move from the position of Figure 41 to that of Figure 38 and pawl 775 enters notch 783. The piston valve closes port 807 and the poppet valve 819 closes the port 820 so that no flow of liquid through the valve is permitted.

If it is desired to print a total at this time, the operator merely lifts the door 63 and the printing of the ticket, with the quantity of fluid dispensed will occur. This operation is effected by means of the mechanism shown in Figure 35 and described above, hence it is deemed unnecessary to redescribe this mechanism.

However, if it is desired to effect one or more dispensing operations before issuing a ticket it is necessary merely to reset the predetermining dials, operate lever 747 and open the valve and the selected quantity will be dispensed by a two stage operation as just described. In this case however, when a record is taken by lifting door 63, the total quantity of fluid dispensed during the series of valve operations will be printed on the ticket.

It will be seen that the rollers 780, 782, 800, 802, and 804 serve to assist the withdrawal of the pawls 775, 751 and 753 from notches in the control bar. It has been found from the experience that unless some friction reducing means is provided, the cams will be incapable of releasing the pawls at the desired moment.

In the event that it is necessary or desirable to attach the control valve at the left side of the mechanism, it will be necessary merely to reverse the control bar 755 so as to bring the notches at the right hand end thereof into position to the right of pawls 751 and 753 and to mount the stop plate 784 in position on the reversed bar in the same relative position as that shown in Figure 38 except that it will now cover the left end of notch 781 and the shoulder 782 will become the abutment which will contact pawl 775 to determine the valve position at the start of the second stage closure. The spring 785 will, of course, have to be anchored so as to bias the control bar toward the right rather than to the left.

The only difference in operation occasioned by this change will be that instead of moving to the right in opening and to the left in closing the valve, the control bar will move to the left in opening and to the right in closing said valve.

Should it become necessary to suddenly terminate the flow of fluid, it will be necessary merely to push in on the knob 59 to cause a counter-clockwise rotation of shaft 525 (Figure 38) which will in turn depress the cam followers 765 and 767 to release shaft 491 for rotation to bring pawl 749 into contact with its ratchet. The depression of pawl 767 causes a depression of latch pawl 783 to withdraw it from the notch 801 in the control bar. The rotation of shaft 525 causes a depression of lever 791 and a corresponding depression of latch pawl 751 and its withdrawal from notch 799 of the control bar. The control bar will immediately assume its second stage position, that is, with the end 790 of stop plate 784 against pawl 775, and as soon as pawl 749 enters the next notch in the gallons ratchet 647, the control bar will return to its initial or valve closing position.

In case it is not desirable to dispense the last portion of the gallon then being dispensed, the operator will push in on knob 59 and simultaneously push up on button 61, whereby the pawls 751 and 753, will be released and shaft 491 will be rotated as just described, and at the same time, the ratchets 649 and 647 will be advanced by pawl 583 so that pawl 749 will enter its ratchet substantially at once and the flow will be stopped immediately upon return of the bar to its initial position.

MODIFIED LATCHING DEVICE—FIGURE 43

The slide 595 and projection 613 of Figure 26 prevent relocking the control bar 41 if resetting is completed before the quantity predetermining dials have been set. This mechanism has the disadvantage however, that the position of the slide on the control bar must be reversed each time the valve is connected to a different end of the control bar. To overcome this difficulty the mechanism disclosed in Figure 43 may be used instead of the slide which is disclosed in Figure 28. This mechanism comprises a bell crank lever 881 which is similar in outline to the bell cranks 539 and 541 of Figure 26. The crank 881 is mounted on shaft 525 to the right of bell crank 539 (Figure 26) and rotates loosely about said shaft. One arm of this crank 881 is offset at 883 so that the outer end 885 which carries a follower 887 will lie in the plane of the emergency ratchet 649 with which the follower is adapted to cooperate.

The depending arm 889 of the bell crank is provided with a notch 891 which is adapted to receive the end of a pawl 893 which is similar to and mounted in alignment with the pawls 497 and 499 of Figure 26 and which, like said pawls, is also fixed to rotate with shaft 491. A spring 895 is connected at one end to pawl 893 and at its other end to the depending arm 889 so as to urge the latter into engagement with the former.

Notch 891 is somewhat less in vertical depth than the notches 567 and 571 of the bell cranks 539 and 541, consequently when pawl 893 is seated in notch 891 the pawls 497 and 499 will not have seated in the notches 567 and 571 respectively of their corresponding bell cranks. The reason for this will become apparent from the description of operation which follows.

OPERATION OF MODIFIED LATCHING DEVICE

It will be recalled that at the end of a dispensing operation, whether it is concluded by the predetermining mechanism or by the emergency stop mechanism, the pawl 505 will always be in engagement with a tooth of the ratchet 647, consequently the ratchet 649 which is fixed to the ratchet 647, will always stop with a tooth occupying the position of Figure 43 so that it may be engaged by the follower 887 as the bell crank 881 is rotated in a counterclockwise direction under the action of spring 895.

As the shaft 491 is rotated counterclockwise (Figure 43) at the end of the resetting and hammer cocking operation, pawl 893 will seat itself in the notch 891 as the bell crank rotates counterclockwise about shaft 525 to bring follower 887 into engagement with a tooth of ratchet 649.

Thus it will be seen that even if the bell cranks 539 and 549 are prevented by the cams 679 and 705 from engaging the pawls 497 and 499 because the operator has not set the predetermining dials, this operation may yet be performed because the shaft 491 is held in its counterclockwise position by pawl 893.

After the predetermining dials have been set, and the valve is opened, the emergency ratchet will advance and the follower 887 will be cammed downwardly to rotate the bell crank in a clockwise direction so that the lever 889 will release pawl 893. By this time, however, the bell cranks 539 and 541 will have been swung into position due to the setting of the predetermining dials and as soon as the lever 893 is released by bell crank 881, the pawls 497 and 499 will settle in the notches of the bell cranks 539 and 541 and control of shaft 491 will be thus restored to the predetermining mechanism proper.

Since the notches 567 and 571 are deeper than the notch 819, a slight clockwise rotation of shaft 491 will be effected when latch 893 is released, and consequently the bell crank 881 will be held out of further engagement with ratchet 649 and the pawl 893 will be entirely cleared of notch 889 so that a further clockwise rotation of shaft 491 may take place at the end of the dispensing operation. The described difference in depth of the notches also permits the bell cranks 539 and 541 to swing freely into position over their respective pawls as soon as the predetermining dials are set.

As the shaft 491 is rotated counterclockwise (Figure 43) at the end of the resetting and hammer cocking operation, pawl 893 will seat itself in the notch 891 as the bell crank rotates counterclockwise about shaft 525 to bring follower 887 into engagement with a tooth of ratchet 649.

Thus it will be seen that even if the bell cranks 539 and 549 are prevented by the cams 679 and 705 from engaging the pawls 497 and 499 because the operator has not set the predetermining dials, this operation may yet be performed because the shaft 491 is held in its counterclockwise position by pawl 893.

It is apparent that various changes in form, construction and arrangement of parts can be made without departing from the spirit of the invention and the right is reserved to make such changes as may fairly come within the scope of the appended claims.

What I claim to be new and desire to protect by Letters Patent of the United States is:

1. In a fluid dispensing apparatus, a meter driven register composed of type-wheels, movable means adapted to support a ticket in one or the other of two positions adjacent said type-wheels, a mask for said apparatus having a slot through which said ticket may be inserted in said supporting means, a closure for said slot, and means cooperating with said closure and said supporting means for locking said supporting means in one of its positions when the closure is in its ineffective position and for locking said closure in its effective position when said supporting means occupies the other of its positions.

2. In a fluid dispensing apparatus, the combination of a printing register adapted to be driven from zero position by a meter, means for resetting said register to zero position, ticket supporting means movable by said resetting means to present a predetermined portion of said ticket adjacent said register, ticket controlling means mounted for movement to effective or ineffective positions and adapted when in effective position to prevent withdrawal of said ticket from said supporting means, and means operable by said ticket controlling means when it is moved to ineffective position for preventing operation of said resetting means.

3. In a fluid dispensing apparatus comprising a conduit, a meter in said conduit, a valve for controlling the flow of fluid from said conduit, the combination of a register adapted to be driven from zero position by said meter, means including actuating means for resetting said register to zero, printing means operated by said actuating means for taking an impression from said reset register, means for locking said valve closed, said actuating means being adapted, upon further operation, to condition said printing means for a second operation, and to operate said locking means to release said valve to permit it to open.

4. In a fluid dispensing apparatus comprising a conduit, a meter in said conduit, a valve for controlling the flow of fluid from said conduit, the combination of a register adapted to be driven from zero position by said meter, means including actuating means for resetting said register to zero, printing means operated by said actuating means for taking an impression from said reset register, first means for holding said valve open, second means for holding said valve closed, said actuating means being adapted, upon further operation, to condition said printing means for a second operation, to operate said second holding means to release said valve to permit it to open and to condition said first holding means for holding said valve open, predeterminer means operable for releasing said first holding means to permit closure of the valve and means operable upon closing of said valve for causing operation of said printing means.

5. In a fluid dispensing apparatus comprising a conduit, a meter in said conduit, a valve for controlling the flow of fluid from said conduit, the combination of a register adapted to be driven from zero position by said meter, means for resetting said register to zero, means movable to feed a ticket relative to said register, a closure for preventing withdrawal of said ticket from said feeding means, means operated with said resetting means to move said feeding means to, and to hold it in a closure locking position, means for locking said valve closed, means operable after resetting for operating said locking means to permit opening of said valve and means operable by said locking means for holding said feeding means in closure locking position, said first named holding means being disabled after resetting is completed.

6. In a fluid dispensing apparatus comprising a conduit, a meter in said conduit, a valve for controlling the flow of fluid from said conduit, the combination of a register adapted to be driven from zero position by said meter, means for resetting said register to zero, means movable to feed a ticket relative to said register, a closure for preventing withdrawal of said ticket from said feeding means, means operated with said resetting means to move said feeding means to, and to hold it in a closure locking position until resetting is completed, valve control means comprising first means for latching said valve open and second means for latching said valve closed, printing means operable after resetting to take an impression from said register, means operable thereafter to operate said second latching means to release said valve and to condition said first latching means for latching the valve open, a device operated by said latch operating means for holding said feeding means in closure locking position after resetting is completed, predetermining means operable, after the valve has been opened, to release said holding device thereby permitting return of said feeding means to initial position, said predetermining means being operable thereafter to unlatch said latching means to permit closure of the valve, and means operable by said valve control means for thereupon causing an operation of said printing means.

7. In a fluid dispensing device for effecting a series of dispensing operations, the combination of means for controlling the discharge of fluid from said device, means for individually recording on a removable ticket the volume of fluid dispensed during each cycle of operation of said control means, means for compelling the insertion of a ticket and the operation of said recording mechanism prior to operation of said control means, means forming a part of said device for automatically registering the total volume of fluid dispensed during said series of operations of said control means and means actuated by said control means for automatically registering the total number of operations composing said series of operations, whereby any unauthorized operation of said device will be disclosed.

8. In a fluid dispensing apparatus comprising a conduit, a meter in said conduit, and actuating means for starting and stopping the flow of fluid from said conduit, the combination of a register adapted to be driven from zero indicating position by said meter, means for resetting said register, means for supporting a ticket, printing means operable in conjunction with said resetting means and cooperating with said register to record the indication thereof on said ticket after resetting, means for latching said actuating means in stopping position, control means operated by said resetting means for unlocking said actuating means, means for locking said resetting means, said last mentioned locking means being adapted to be released upon insertion of said ticket.

9. In a fluid dispensing device having a conduit, a meter in said conduit, a valve for said conduit, means for controlling the operation of said valve comprising a bar adapted to be moved longitudinally by said valve in opening and closing, pawl means arranged to engage said bar to lock said valve open, additional pawl means arranged to engage said bar to hold said valve closed, means operable automatically, under control of said meter, for disengaging one of said pawl means from said bar and conditioning the other of pawl means for locking engagement with said bar.

10. In a fluid dispensing device having a conduit, a meter in said conduit, a valve for said conduit, means for controlling the operation of said valve comprising a bar adapted to be moved longitudinally by said valve in opening and closing, pawl means arranged to engage said bar to lock said valve open, pawl means arranged to engage said bar to hold said valve closed, predetermining means operated by said meter for disengaging said first named pawl from locking engagement with said bar and for conditioning said second named pawl for locking engagement with said bar.

11. In a fluid dispensing device, the combination of a meter driven register, means adapted to receive and support a ticket pack adjacent said register, means for obstructing access to said ticket after it has been inserted in said support, printing means for causing an impression of the register to be taken by said ticket pack and means actuated by said obstructing means for causing operation of said printing means when said obstructing means is rendered ineffective.

12. In a fluid dispensing device, comprising a meter, a predetermining mechanism, primary and secondary indicating dials, driving connections between said meter and said primary dial, instantaneously operating transfer means between said primary and secondary dials, said driving connections and transfer means being adapted to permit independent rotation of said dials, an adjusting element movable in either of two directions and means connecting said dials with said elements so that motion thereof, in one direction will adjust said primary dial, and motion of said element in the other direction will operate said secondary dial.

13. In an apparatus of the kind described, the combination of a flow line comprising a valve, means adapted to be conditioned for locking said valve open, said means comprising a rockshaft, means for latching said rockshaft in conditioned position, a quantity predetermining mechanism adapted to be driven during dispensing and including means adapted to release said latching means when dispensing is to be terminated, additional means for latching said rockshaft in conditioned position irrespective of the condition of said predetermining mechanism, said last named latching means being arranged to be rendered ineffective by said predetermining means after dispensing of fluid is started.

14. In an interlocked recording predetermined stop device adapted to control an associated mechanism, a control member mounted for movement to positions to start or stop said mechanism, a register connected to be driven from zero position by said mechanism in accordance with the operation thereof, means including actuating means for resetting said register to zero, printing means operable by said actuating means for taking an impression from said register after completion of resetting, means for holding said member in stop position, said actuating means being adapted upon further operation to condition said printing means for a second operation and to release said holding means.

15. In an interlocked recording predetermined stop device adapted to control an associated mechanism, a control member mounted for movement to positions to start or stop said mechanism, a register connected to be driven from zero position by said mechanism in accordance with the operation thereof, means including actuating means for resetting said register to zero, printing means operated by said actuating means for taking an impression from said register after the completion of resetting, means for retaining said control member in start or stop positions, said actuating means being adapted upon further operation to condition said printing means for a second operation; to operate said retaining means to release said control member for movement to start position and to retain it there, predetermining means driven by said mechanism and connected to release said retaining means to permit movement of the control element to stop position, and means operable by the movement of said control element to stop position for causing the operation of said printing means.

16. In an interlocked recording predetermined stop device adapted to control an associated mechanism, a control member mounted for movement to positions to start or stop said mechanism, a register connected to be driven from zero position by said mechanism in accordance with the operation thereof, means movable to feed a ticket relative to said register, a closure for preventing withdrawal of said ticket from said feeding means, means operated with said resetting means to move said feeding means to and hold it in closure locking position, means for locking said control member in stop position, means operable after resetting for releasing said locking means, a latch for holding said feeding means in closure locking position and connected to be rendered effective as said locking means is released, and means for disabling said first named holding means after said latch is rendered effective.

17. In an interlocked recording predetermined stop device adapted to control an associated mechanism, a control member mounted for movement to positions to start or stop said mechanism, a register connected to be driven from zero position by said mechanism in accordance with the operation thereof, means for resetting said register to zero, means movable to feed a ticket relative to said register, a closure for preventing withdrawal of said ticket from said feeding means, means operated with said resetting means to move said feeding means to and to hold it in a closure locking position until resetting is completed, means for latching said control member in stop or start positions, printing means operable after resetting to take an impression from said register, means operable thereafter to operate said latching means to release control member for movement from stop position and to condition said latching means for latching the control member in start position, a device operated by said latching means for holding said feeding means in closure locking position after resetting is completed, predetermining means operable to release said holding device thereby permitting return of said feeding means to initial position, said predetermining means being operable thereafter to unlatch said latching means to permit return of said member to stop position and means for thereupon causing an operation of said printing means.

18. In an interlocked recording predetermined stop device adapted to control an associated mechanism, a control member mounted for movement to positions to start or stop said mechanism, a register connected to be driven from zero position by said mechanism in accordance with the operation thereof, means for resetting said register, means for supporting a ticket, printing means cooperating with said register to record the indication thereof on said ticket, means for locking said member in stop position, means operated by said resetting means for unlocking said locking means, means for locking said resetting means, said last mentioned locking means being adapted to be released upon insertion of a ticket in said supporting means.

19. In a fluid dispensing apparatus, the combination of a register adapted to be driven from zero position, resetting means for said register, printing means for cooperating with said register, means for supporting a ticket adjacent said register, means for locking said resetting means, said locking means being releasable by the insertion of said ticket, an actuator, means operable by said actuator in sequence for resetting said register and taking an impression from said reset register on said ticket.

20. In a fluid dispensing apparatus, the combination of a register, printing means for cooperating with said register, means for supporting a ticket adjacent said register, a manually operable closure for normally preventing access to said ticket, and means operable by said closure as it is moved from normal position for actuating said printing means.

21. In a fluid dispensing apparatus, the combination of a register comprising type elements adapted to be displaced from zero position, actuating means, means connected for operation by said actuating means for resetting said type elements to zero, ticket supporting means mounted for movement to predetermined positions adjacent said type elements to present different portions of a ticket thereto, means connected to said actuating means for moving said supporting means to one position prior to completion of resetting, and means operated by said actuating means at the completion of resetting for taking an impression from said type elements on that portion of the ticket presented by said supporting means.

22. In a fluid dispensing apparatus, the combination of a register comprising type elements adapted to be displaced from zero position, actuating means, means connected for operation by said actuating means for resetting said type elements to zero, ticket supporting means mounted for movement to predetermined positions adjacent said type elements to present different portions of a ticket thereto, manually operable means for locking said ticket in said ticket supporting means, means connected to said actuating means for positioning said supporting means in one position prior to completion of resetting, means operated by said actuating means at the completion of resetting for taking an impression from said type elements on one portion of said ticket, upon the presented portion of said ticket, means for thereafter moving said positioning means to another position, and means operable by movement of said locking means for operating said impression taking means for imprinting the type elements on the newly presented portion of said ticket.

23. In a fluid dispensing apparatus, a register comprising type elements adapted to be displaced from zero position, means including an actuator for resetting said elements to zero position, movable means operable by said actuator for supporting a ticket in one or the other of two positions adjacent said type elements, means operable by said actuator for taking an impression from said type elements at the completion of operation of said resetting means, means for thereafter moving said supporting means to the other of its positions, and means independent of said actuator for taking another impression from said type elements.

24. In a fluid dispensing device, a register comprising type elements adapted to be driven from zero position, means for supporting a ticket adjacent said type elements, printing means disposed adjacent said type elements and ticket supporting means and adapted to impress the type on the ticket, means for conditioning said printing means for a printing operation, means for retaining said printing means in said condition, a closure arranged to prevent access to said ticket supporting means, said closure being movable out of preventing position, and means actuated by movement of said closure out of preventing position for releasing said retaining means, whereby said printing means will effect an impression of said type elements on the ticket.

25. In a fluid dispensing apparatus comprising a conduit, a meter in said conduit and a valve for controlling the flow of fluid through the meter and conduit, the combination of a register adapted to be driven from zero position by the meter, means for resetting said register, a movable platen adapted to take an impression from said register, a ticket support adapted to be moved from one position to another, a closure for preventing access to the ticket support, said support being adapted when in one position to lock said closure in operative position, a latch mechanism adapted to hold said valve closed, an actuating mechanism operable in a cycle comprising means for concurrently actuating said register resetting means, moving said ticket support to closure locking position, energizing said platen, and for thereafter releasing said platen for taking an impression, and means for thereafter again energizing said platen and for releasing said latch mechanism, means including said ticket support for preventing operation of said actuating means, means for rendering said preventing means ineffective upon insertion of a ticket in said support, a retaining mechanism adapted to hold said valve open, a predetermining mechanism adapted to hold said ticket support in closure locking position and being adapted to release said retaining mechanism and said ticket support after a predetermined operation of the meter, and means actuated by said retaining mechanism when it is released for actuating said platen, an operations register and means actuated once during each cycle of said actuating mechanism for advancing said register one unit.

26. In a fluid dispensing apparatus, the combination of a register comprising type elements adapted to be displaced from zero position, a platen associated with said register, actuating means, means connected for operation by said actuating means for resetting said type elements to zero, ticket supporting means mounted for movement to predetermined positions adjacent said type elements to present different portions of a ticket thereto, means connected to said actuating means for positioning said supporting means at one position prior to completion of resetting, means movable to effective position to prevent removal of said ticket, means operated by said supporting means as it is moved to said position for locking said preventing means in effective position, means adapted to be operated by said actuating means and adapted to effect operation of said platen at the completion of resetting for taking an impression from said type elements, said positioning means being adapted upon further operation of said actuating means to release said supporting means to occupy another position, and means actuatable at the conclusion of the dispensing operation for again actuating said platen to take an impression from the type elements.

27. In a fluid dispensing apparatus, a register comprising type elements adapted to be displaced from zero position, means for resetting said elements to zero position, means for supporting a ticket adjacent said type elements, said supporting means being formed with a slot for the reception of a ticket, a closure for said slot having operative and inoperative positions, means associated with said support for preventing the operation of said resetting means, said associated means being positioned to be disabled by the insertion of a ticket in said supporting means and additional means under control of said closure for preventing operation of said resetting means when said closure is in inoperative position.

28. In a fluid dispensing apparatus, a register comprising type elements adapted to be displaced from zero position, means for resetting said elements to zero position, means for supporting a ticket adjacent said type elements, said supporting means being formed with a slot for the reception of a ticket, a closure for said slot having operative and inoperative positions, means associated with said support for preventing the operation of said resetting means, said associated means being positioned to be disabled by the insertion of a ticket in said supporting means, additional means independent of said associated means for preventing operation of said resetting means, and means actuatable by movement of said closure to operative position for disabling said additional preventing means and means comprising said supporting means, said actuatable means and said additional preventing means for locking said closure in operative position during resetting.

29. In a ticket printing register, comprising type elements adapted to be driven from a zero indicating position, means for resetting said type elements to zero, a chute adapted to receive a ticket, means for supporting said chute for movement relative to and adjacent to said type elements, means for actuating said resetting means and said chute, latch means associated with said chute for preventing actuation of said resetting means by preventing movement of said chute, and an element positioned for actuation by a ticket inserted in said chute for releasing said latch means.

30. In a ticket printing register, comprising type elements adapted to be driven from a zero indicating position, means for resetting said type elements to zero, a chute adapted to receive a ticket, means for supporting said chute for movement relative to and adjacent to said type elements, means for actuating said resetting means and said chute, latch means associated with said chute for preventing actuation of said actuating means and resetting means by preventing movement of said chute, and an element positioned for actuation by a ticket inserted in said chute for releasing said latch means, a second latch means for preventing actuation of said chute, a closure adapted to prevent access to said chute, said closure being movable to ineffective position, and means operated by said closure for rendering said second latch means effective when said closure occupies its ineffective position.

31. In a printing register, the combination of type elements adapted to be moved from zero indicating position, means for resetting said elements to zero, means for supporting a ticket adjacent said type elements, a platen adapted to cooperate with said type elements to take impressions on the ticket, power means for actuating said platen, an actuator comprising means for simultaneously resetting said register and energizing said power means, means for causing an operation of said power means, and additional means for again energizing said power means, a latch for restraining said platen against actuation a withdrawable closure for preventing access to said ticket supporting means, a lock adapted to prevent operation of said actuator when said closure is withdrawn, and means connected with said closure for releasing said latching means to effect an operation of said power means when said closure is withdrawn.

32. In a printing register, the combination of type elements adapted to be moved from zero indicating position, means for resetting said elements to zero, means for supporting a ticket adjacent said type elements, a platen adapted to cooperate with said type elements to take impressions on the ticket, power means for actuating said platen, an actuator comprising means for simultaneously resetting said register and energizing said power means, means for causing an actuation of said power means to operate said platen and additional means for again energizing said power means, a latch for restraining said platen against actuation, a lock for preventing operation of said actuating means and means actuated by the insertion of a ticket in said ticket support for releasing said lock, a withdrawable closure for preventing access to said ticket supporting means, a lock adapted to prevent operation of said actuator when said closure is withdrawn, and means connected with said closure for releasing said latching means to effect an operation of said power means when said closure is withdrawn.

33. In a printing register, the combination of type elements adapted to be moved from zero indicating position, means for resetting said elements to zero, means for supporting a ticket adjacent said type elements, a platen adapted to cooperate with said type elements to take impressions on the ticket, power means for actuating said platen, an actuator comprising means for simultaneously resetting said register and energizing said power means, means for causing an operation of said power means, and additional means for again energizing said power means, a latch for restraining said platen against actuation, a withdrawable closure for preventing access to said ticket supporting means, a lock adapted to prevent operation of said actuator when said closure is withdrawn, and means connected with said closure for releasing said latching means to effect an operation of said power means when said closure is withdrawn, and means operated intermediate operations of said power means for moving said ticket supporting means to present a fresh portion of the ticket to said type wheels.

34. In a fluid dispensing apparatus comprising a conduit, a meter in said conduit, operating means for stopping or starting the flow of fluid from said conduit, the combination of a register adapted to be driven from zero position by said meter, means including actuating means for resetting said register to zero, printing means operated by said actuating means for taking an impression from said reset register, means for locking said operating means in flow stopping position, said actuating means being adapted, upon further operation, to condition said printing means for a second operation, and to operate said locking means to release said operating means for movement to start the flow.

35. In a fluid dispensing apparatus comprising a conduit, a meter in said conduit, operating means movable to flow starting or stopping position to control the flow of fluid in said conduit, the combination of a resettable register adapted to be driven by said meter, means including actuating means for resetting said register, means for holding said operating means in flow stopping position, said actuating means being adapted, upon further operation, to render said holding means ineffective, means for holding said operating means in flow starting position and a predeterminer mechanism driven by said meter for releasing said last named holding means after a predetermined flow of liquid through said meter.

36. In a fluid dispensing apparatus comprising a conduit, a meter in said conduit, operating means movable to flow starting or stopping position to control the flow of fluid in said conduit, the combination of a resettable register adapted to be driven by said meter, means including actuating means for resetting said register, means for holding said operating means in flow stopping position, said actuating means being adapted, upon completion of resetting, to render said holding means ineffective, means for holding said operating means in flow starting position, means urging said operating means toward flow stopping position and a predeterminer mechanism driven by said meter for releasing said last named holding means after a predetermined flow of fluid through said meter.

WILLIAM M. CARROLL.